United States Patent [19]

Hata et al.

[11] Patent Number: 4,614,417

[45] Date of Patent: Sep. 30, 1986

[54] CAMERA

[75] Inventors: Yoshiaki Hata, Nishinomiya; Toshiaki Matsumoto; Shinji Tominaga, both of Osaka; Koji Yamamoto, Sakai; Maki Yamashita; Yoshihiro Tanaka, both of Osaka, all of Japan

[73] Assignee: Minolta Camera Kabushiki Kaisha, Osaka, Japan

[21] Appl. No.: 686,668

[22] Filed: Dec. 27, 1984

[30] Foreign Application Priority Data

| | | | |
|---|---|---|---|
| Dec. 29, 1983 | [JP] | Japan | 58-246467 |
| Feb. 15, 1984 | [JP] | Japan | 59-27831 |
| Feb. 15, 1984 | [JP] | Japan | 59-27832 |
| Mar. 5, 1984 | [JP] | Japan | 59-42788 |
| Mar. 5, 1984 | [JP] | Japan | 59-42789 |
| Jul. 14, 1984 | [JP] | Japan | 59-146200 |

[51] Int. Cl.$^4$ ............... G03B 3/00; G03B 7/097; G03B 7/08
[52] U.S. Cl. ............... 354/403; 354/435
[58] Field of Search ............... 354/400–403, 354/415, 419, 421, 435–437, 440, 448, 230

[56] References Cited

U.S. PATENT DOCUMENTS

| | | | |
|---|---|---|---|
| 4,079,387 | 3/1978 | Kawamura et al. | 354/448 |
| 4,317,624 | 3/1982 | Shenk | 354/421 X |
| 4,345,825 | 8/1982 | Matteson | 354/421 |
| 4,435,058 | 3/1984 | Yoshida et al. | 354/403 |

*Primary Examiner*—William B. Perkey
*Attorney, Agent, or Firm*—Watson Cole Grindle & Watson

[57] ABSTRACT

A camera constructed compact, wherein one position signal outputting device is used in an auto-focusing device and an auto-exposure control device. The camera comprises a displacement mechanism, a focusing control mechanism, an exposure control mechanism, a position signal outputting device, a distance measuring device, a focusing stop mechanism, a light measuring apparatus and a focusing stop mechanism.

18 Claims, 26 Drawing Figures

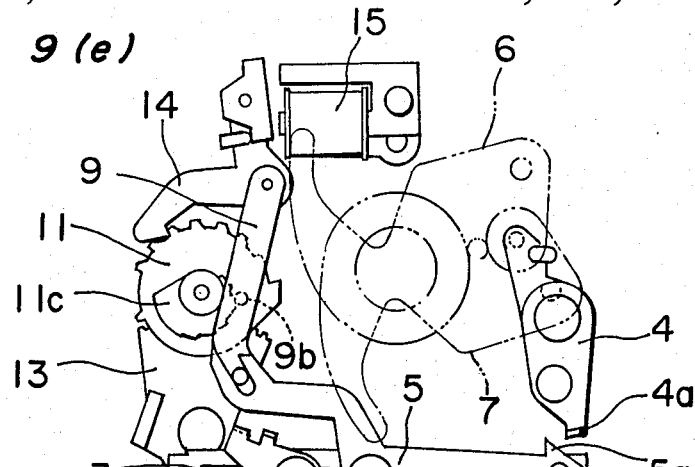
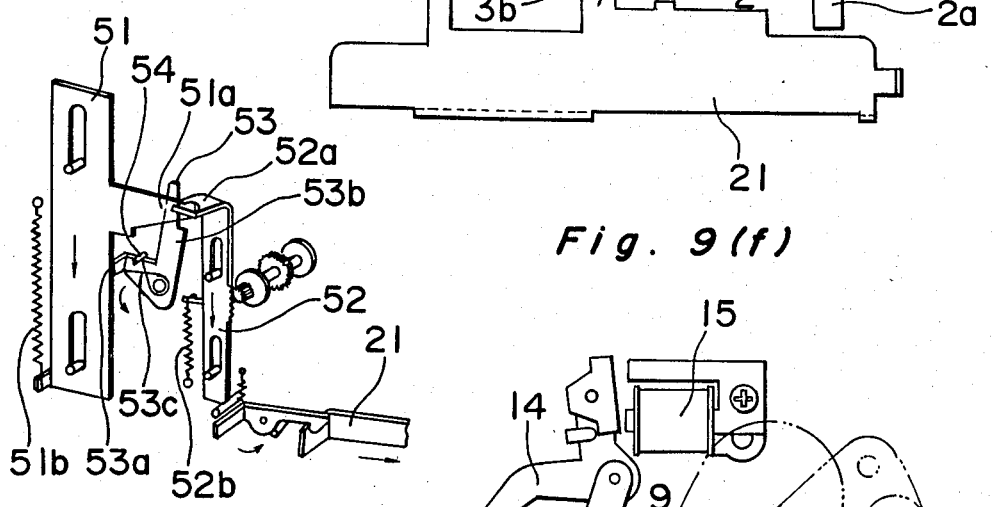
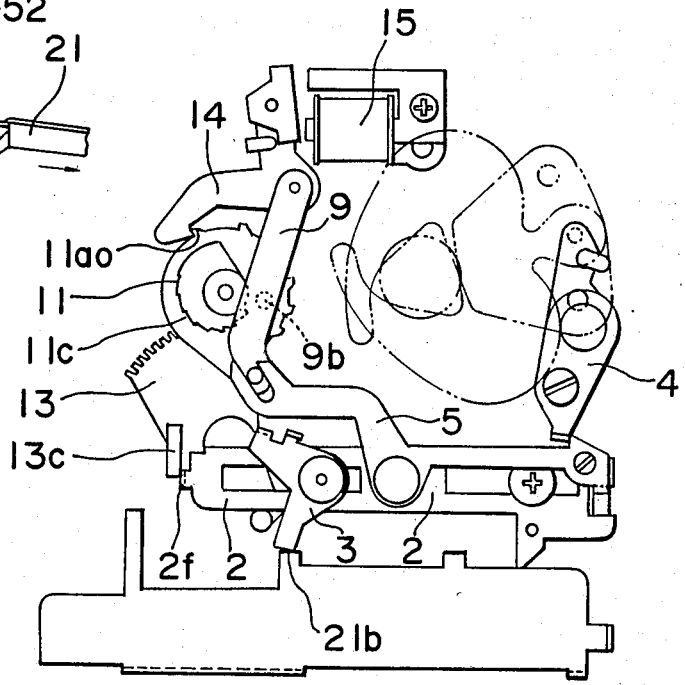

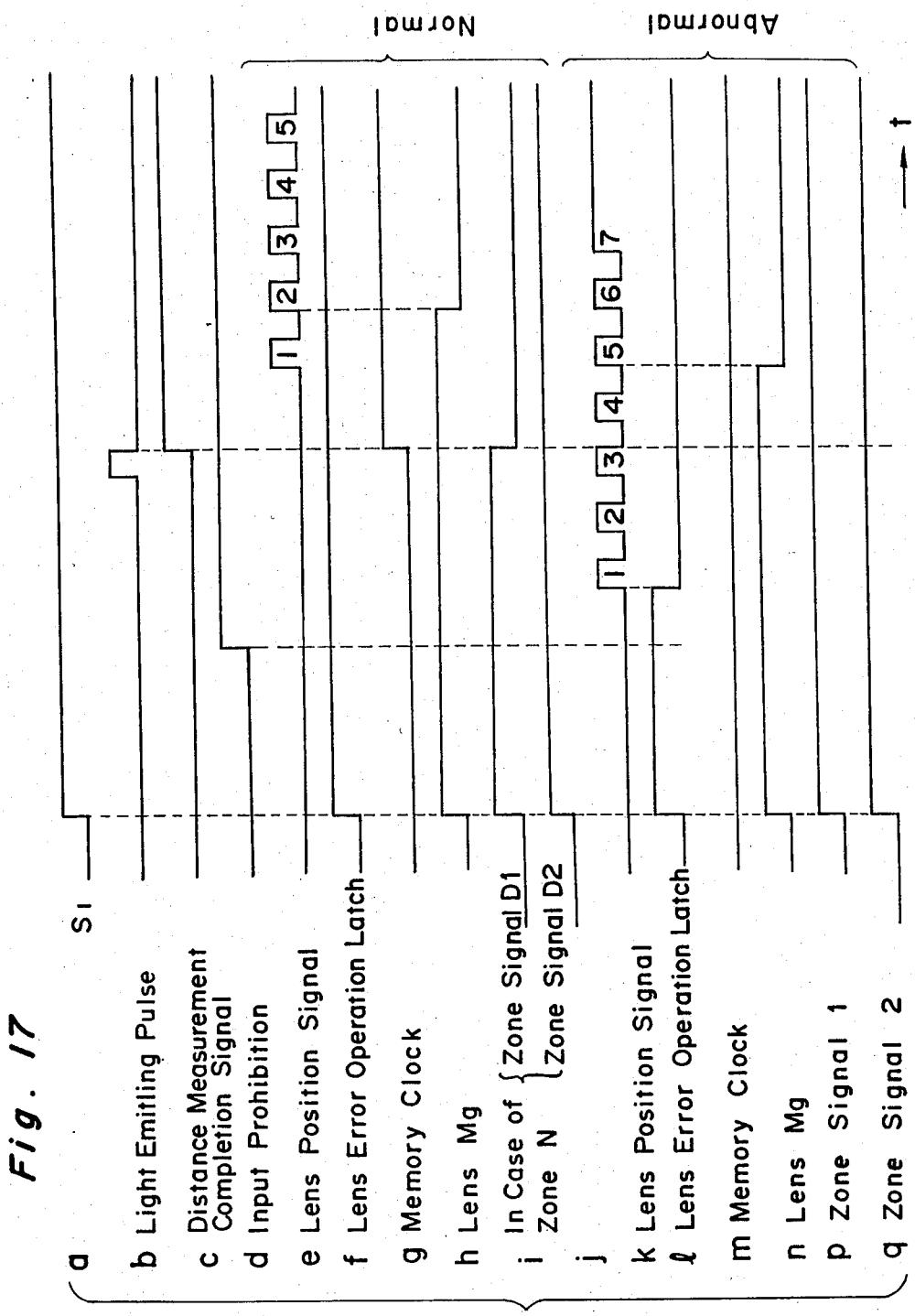

CAMERA

BACKGOUND OF THE INVENTION

1. Field of the Invention

The present invention relates to a camera constructed compact, wherein one position signal outputting device is used in an auto-focusing device and an auto-exposure control device.

2. Description of the Prior Art

In some conventional camera auto-focusing devices, it was known that the lens was caused to come to a stop when an object distance signal conformed to a lens position signal. In such a device as described hereinabove, a position signal outputting device for outputting a position signal in accordance with the moving position of the lens was used (for example, in Japanese Laid-open Patent Publications (Tokkaisho) Nos. 55-59443, 58-19914, 55-98724, etc.).

Also, in an automatic exposure control device in a camera for controlling the aperture in accordance with object brightness, shutter speed, film sensitivity, etc., the aperture was brought to a stop when an aperture control signal conformed to an aperture signal corresponding to the actual aperture value or the aperture value to which the aperture had been stopped down from the full open aperture value. Even in this device, a position signal outputting device in accordance with the position of an aperture interlocking member as an aperture signal was used (for example, in Japanese Laid-open Patent Publications (Tokkaisho) Nos. 55-156922, 57-150828, 54-39127, 54-160236, Japanese Utility Model Laid-open Publication (Jikkaisho) No. 56-32821, etc.).

Such a position signal outputting apparatus as described hereinabove is provided with a conductive pattern disposed corresponding to the movement range of a connecting member connected to the lens or aperture and a sliding brush for sliding on it or a substitute devices (light chopper, the other pulse generating device), and occupies a large space in the camera. Accordingly, a camera equipped with an automatic focusing device and an automatic exposing device had a disadvantage in that the camera became larger in size and the parts become more in number when the position signal outputting device was used even in either device.

SUMMARY OF THE INVENTION

An object of the present invention is to provide a camera, compact in size and low in price, wherein one position signal outputting device is used for an auto-focusing device and an auto-exposure control device which are incorporated in this type of camera.

A camera provided with an exposure control device and an auto-focus control device is provided with a displacement mechanism, a focus control mechanism which is connected to an optical system for focusing use and which operates through the operation of the displacement mechanism to move along the optical axis of the optical system for focusing use to a position corresponding to the operation position, an exposure control mechanism which is connected to an exposure mechanism and which operates through the operation of the displacement mechanism to control the exposure amount through the exposure mechanism in accordance with the operation position, a position signal outputting device for outputting a position signal showing the displacement position of the displacement mechanism, a distance measuring device for outputting a distance signal corresponding to an object distance, a focusing stop mechanism for stopping the focusing control mechanism in accordance with the position signal and the distance signal, a light measuring device for outputting a brightness signal including object brightness information or film sensitivity information, and an exposure stop mechanism for stopping the control mechanism for exposure in accordance with the position signal and the brightness signal.

BRIEF DESCRIPTION OF THE DRAWINGS

This and other objects and features of the present invention will become apparent from the following description taken in conjunction with preferred embodiments thereof with reference to the accompanying drawings, throughout which like parts are designated by like reference numerals, and in which:

FIGS. 9(a) through 9(f) are explanatory diagrams showing the sequence of operation of FIG. 2;

FIG. 10 is a perspective view showing a modified example of one portion of FIG. 2;

FIG. 17 is a time chart of signals in FIG. 16;

DESCRIPTION OF THE PREFERRED EMBODIMENTS

Figure 1:
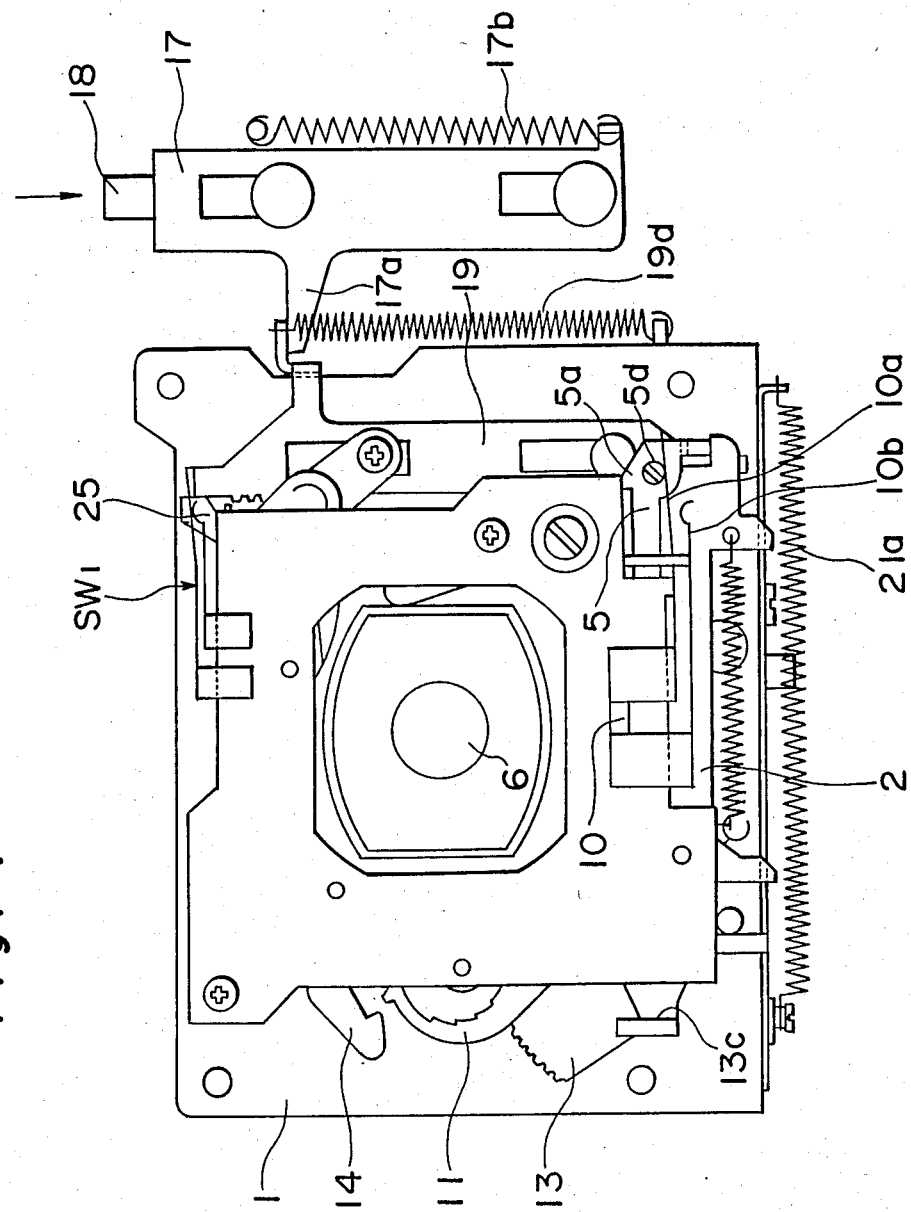
FIG. 1 is a plan view of one side of a shutter baseplate of a camera of the present invention.

A camera shown in the drawings is provided with, as mechanical arrangements, a displacement mechanism composed of gears 38, etc., a focus control mechanism composed of a fan-shaped gear 35 for AF use, etc., an exposure control mechanism composed of a stop cam 11, etc., and a position signal outputting device composed of conductive patterns 46, 47, 49, etc. as shown in FIGS. 1 to 9. As electric arrangements, it is also provided with, as shown in FIGS. 11 and 13 to 16, a light measuring device including a light receiving means 102, a distance measuring device including an AF circuit 105, a focusing stop mechanism 34 including a magnet for AF use.

First, the mechanical arrangements will be described with reference to FIG. 1 to FIG. 9.

Figure 2:
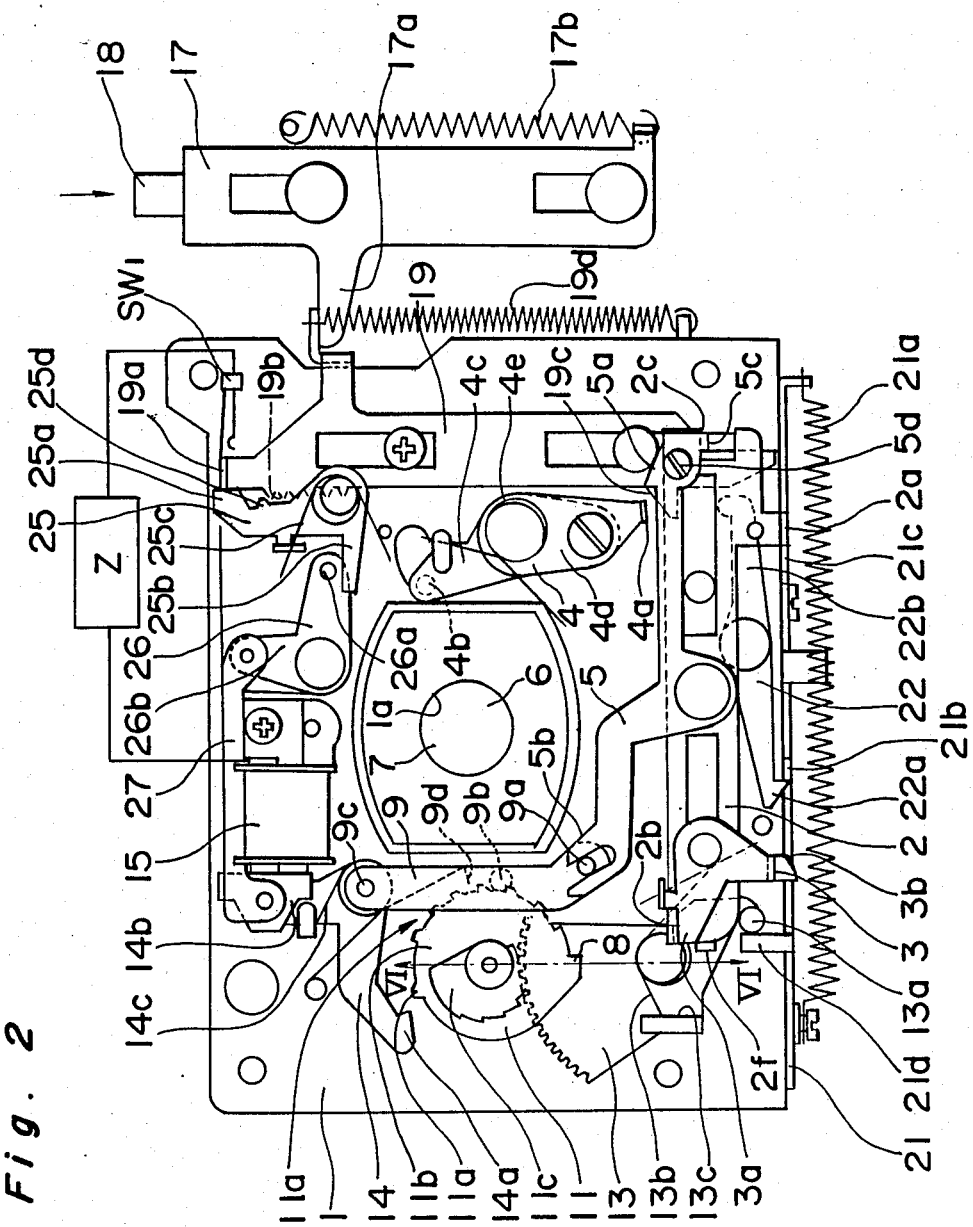
FIG. 2 is a plane view of FIG. 1 with the top plate is removed.
Figure 3:
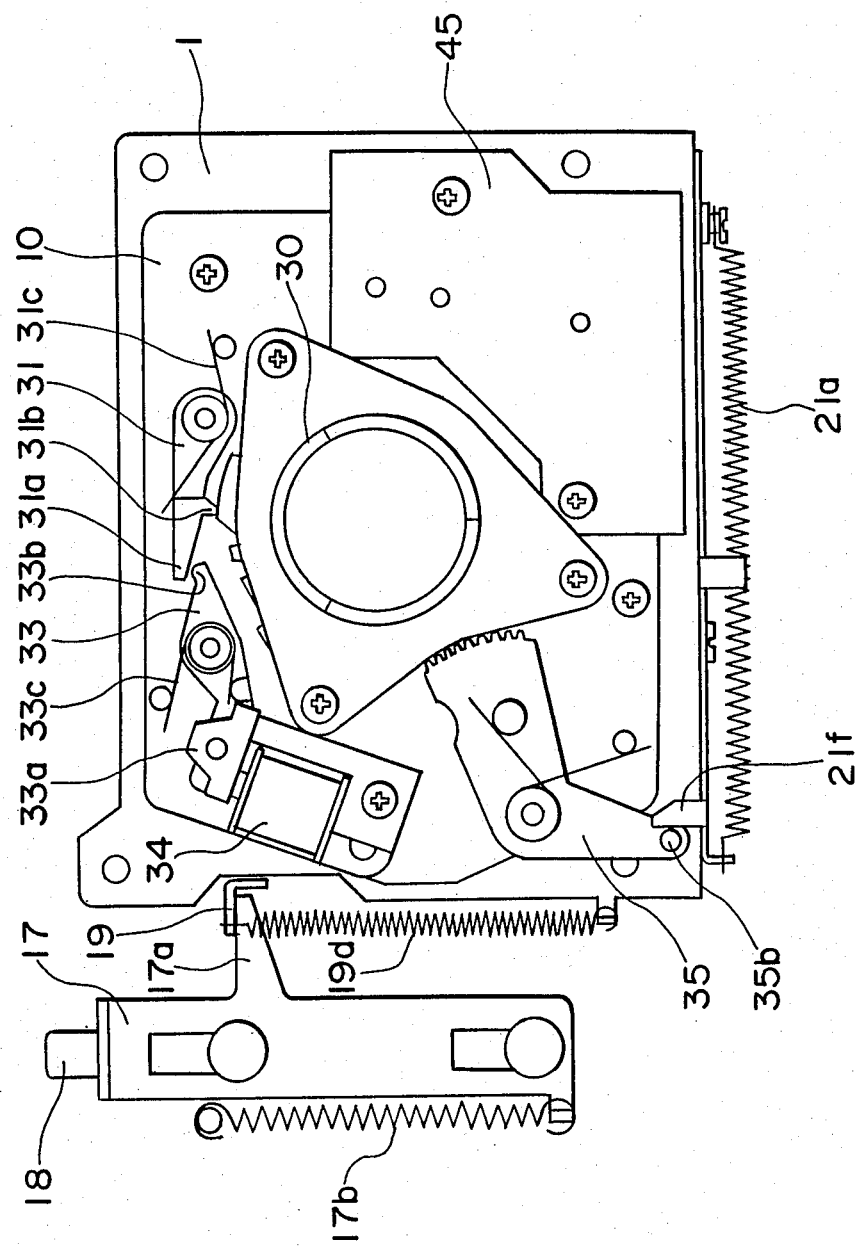
FIG. 3 is a plan view of the other side of the shutter base plate of FIG. 1.
Figure 4:
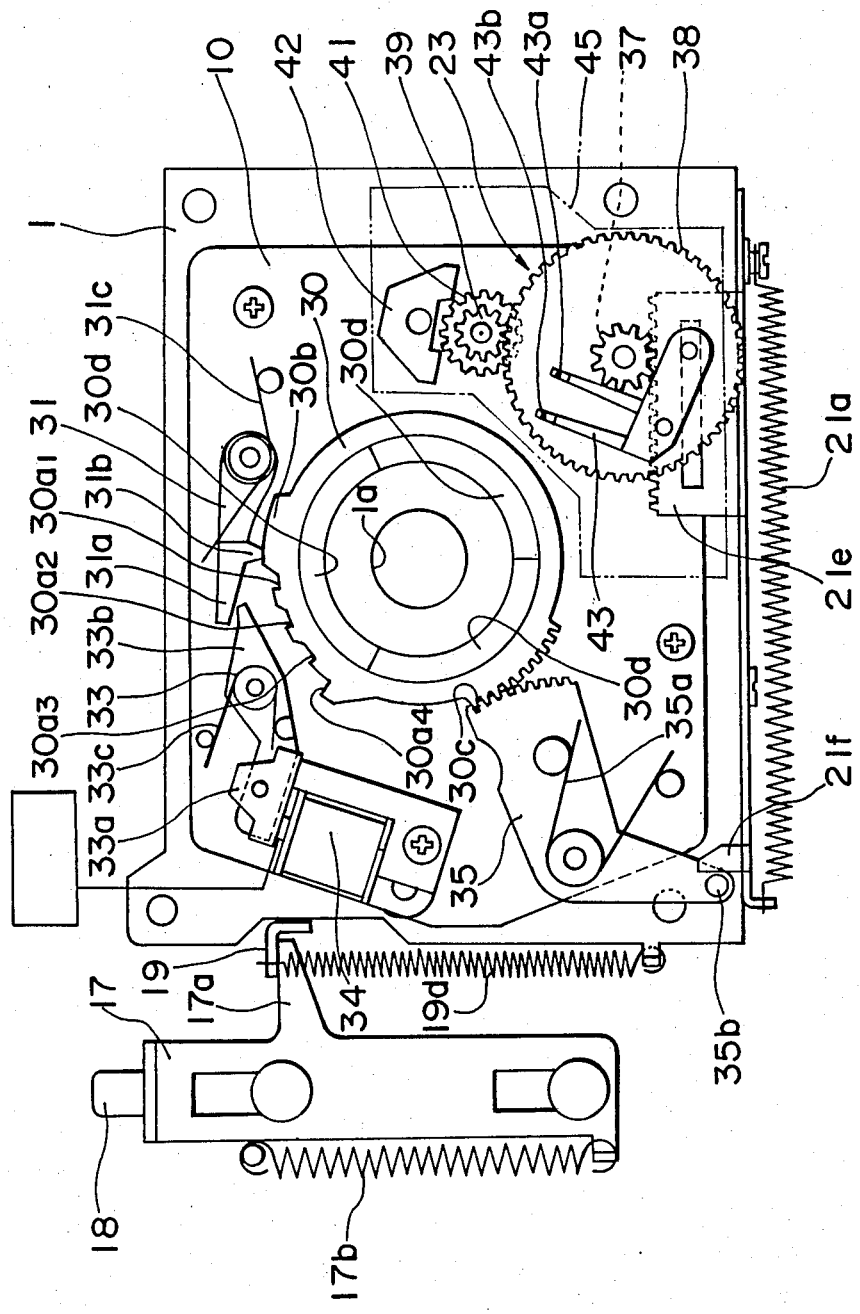
FIG. 4 is a plan view of FIG. 3 with the top plate
Figure 5:
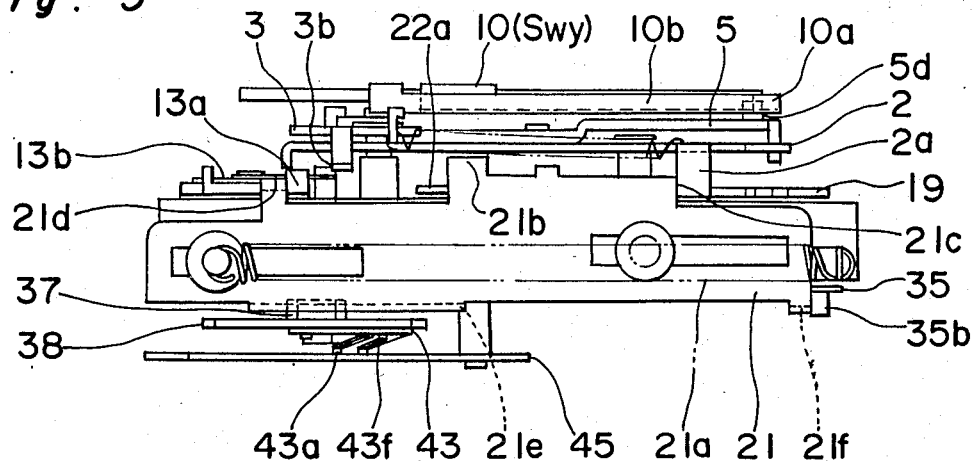
FIG. 5 is a bottom view of the under side of the shutter base plate of FIG. 1.

The auto-exposure control mechanism as shown in FIGS. 1 and 2 is disposed on the rear face of a shutter base plate 1 provided within a main body of the camera as shown in FIG. 5. Also, the displacement mechanism, the auto-focus control mechanism, and the position signal outputting device as shown in FIGS. 3 and 4 are disposed on the front face of the shutter base plate 1.

Referring to FIGS. 1 and 2, the shutter switching mechanism of an auto-exposure control mechanism is provided with a shutter plate 2, a shutter plate engagement lever 3, a switching lever 4, a shutter drive lever 5, shutter blades 6 and 7 (see FIG. 9), an interlocking lever 9, and a stop cam 11.

Figure 9A:
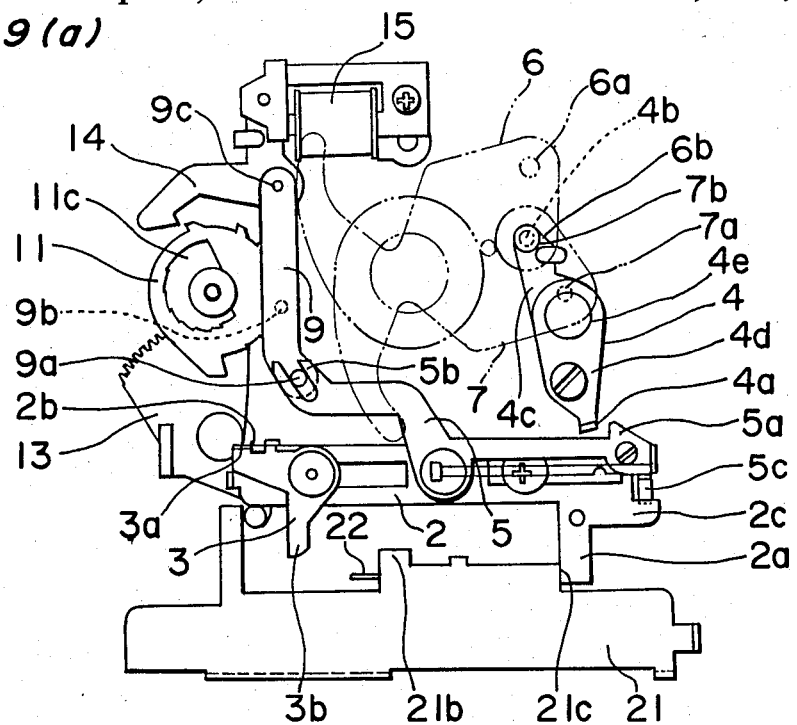

The shutter plate 2 has an underside projection 2a and has notch portions 2b and 2c on left and right sides, respectively, and is supported through guide pins so that the shutter plate may move freely in the left and right directions as viewed in FIG. 1 on the base plate 1 and is leftwardly urged with a spring suspended between it and the base plate 1. The shutter plate 2 comes to a stop, as shown in FIG. 9a, through the engagement of the notch portion 2b with the shutter plate engagement lever 3, and upon disengagement, the shutter plate 2 is moved leftwardly, as viewed in the drawings, by the spring. The shutter drive lever 5 is at its central portion mounted pivotally on the shutter plate 2 by means of a pin and has on its one side a hook portion 5a to be engaged with the bent portion 4a of the switching lever 4, and a bent portion 5c to be engaged with the notch portion 2c of the shutter plate 2. The lever 5 also has on its other side a fork portion 5b to be engaged with a pin 9a of the interlocking lever 9 so that the shutter drive lever is urged counterclockwise by the spring 9d of the interlocking lever 9 interlocked through the fork portion 5b to come to a stop because of the contact between the bent portion 5c and the concave end face 2c of the shutter plate 2.

As shown in FIGS. 9(a) to 9(f), a pair of shutter blades 6 and 7 formed on the central portion of the shutter base plate 1 for controlling an exposure opening 1a are supported for pivotal movement about the fixed shafts 6a and 7a of the base plate 1, respectively, to perform the control operation because the blades 6 and 7 can be driven through the engagement of the long holes 6b and 7b of the shutter blades 6 and 7 with the control pin 4b of the switching lever 4. The switching lever 4 is provided with a first lever 4c having the control pin 4b, and a second lever 4d which has a bent portion 4a to be engaged with a shutter drive lever 5 combined integrally by an eccentric pin onto the first lever 4c. The lever 4 is supported for pivotal movement around the fixed shaft 4e of the base plate 1 and is urged counterclockwise by the spring. When the lever 4 is located in a position where it has been pivoted counterclockwise, as shown in FIG. 9(a), by the urging force of the spring, the shutter blades 6 and 7 are closed, but when the lever 4 is pivoted clockwise against the urging force of the spring by the shutter drive lever 5 then moved leftwards, the shutter blades 6 and 7 open a given amount in accordance with the pivotal angle.

Thereafter, when the lever 4 is released from the shutter drive lever 5, it is pivoted again counterclockwise by the urging force of the spring to close the shutter blades 6 and 7.

Figure 6:
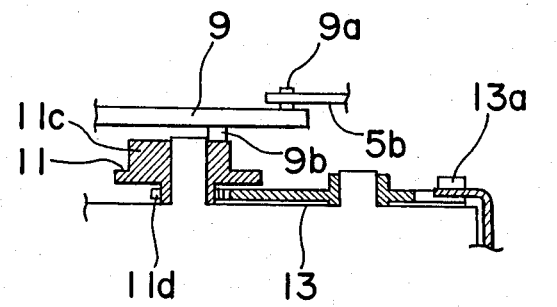
FIG. 6 is a cross-sectional view taken along the line VI—VI in FIG. 2.

As shown in FIG. 6, the interlocking lever 9, which has a pin 9a to be engaged with the fork portion 5b of the shutter drive lever 5, and a pin 9b to be engaged with a stop cam 11, is supported for pivotal movement around the fixed shaft 9c of the base plate 1 and is urged clockwise as viewed in FIG. 2 by the spring 9d.

The stop cam 11 supported pivotally on the fixed shaft of the base plate 1 has a large diameter portion 11b provided with a plurality of pawls 11a, a stepped cam 11c to be engaged with the pin 9b of the interlocking lever 9, the distance between the stepped cam 11c and the center of the rotary shaft varying stepwisely. The stop cam 11 is integrally combined with a gear 11d coupled to a fan-shaped gear 13 for AE use as shown in FIG. 6 and the gear 11d is pivoted counterclockwise as viewed in the drawing through the interlocking with the operation of the fan-shaped gear 13 as described later. The stop pawl lever 14, which is provided with a hook portion 14a to be engaged with one of the pawls 11a of the stop cam 11 and a magnetizeable member 14b to be magnetically attracted by the AE magnet 15 for constituting an exposure stop-mechanism secured to the base plate 1, is supported pivotally on the fixed shaft 9c and is urged clockwise by the spring 14c, and is pivoted counterclockwise by a force larger than the urging force of the spring 14c in a manner described later. Each pawl 11a in the stop cam 11 and each step of the stepped cam 11c are formed in positions corresponding to each other, and when one pawl 11a is engaged with the stop pawl lever 14, the step of the cam 11c corresponding to the pawl 11a is brought into the path of movement of the pin 9b of the interlocking lever 9 to engage the pin 9b thereby to prevent the clockwise pivot of the interlocking lever 9 through the engagement with the pin 9b. Thus, the position at which the lever 9 being pivoted clockwise by the engagement of the step of the cam 11c with the pin 9c is stopped is determined depending on which one of the pawls 11a of the stop cam 11 is engaged to the stop pawl lever 14.

Figure 9B:
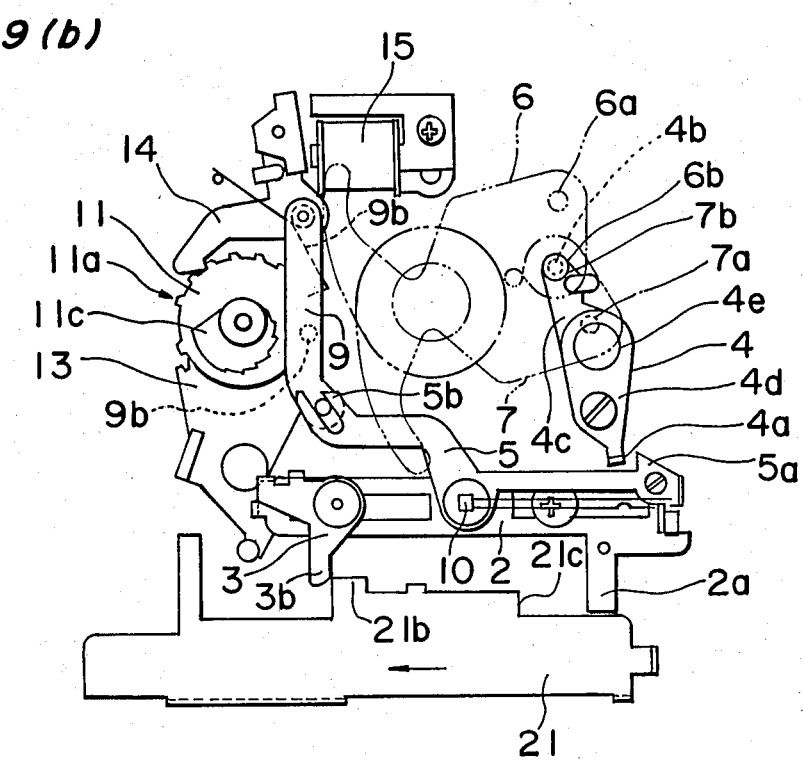
Figure 9C:
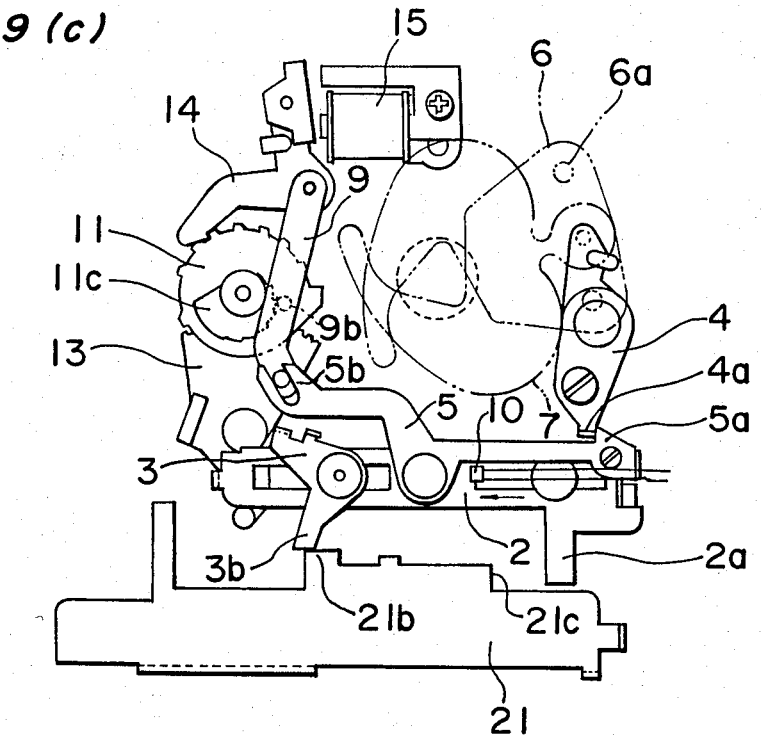
Figure 9D:
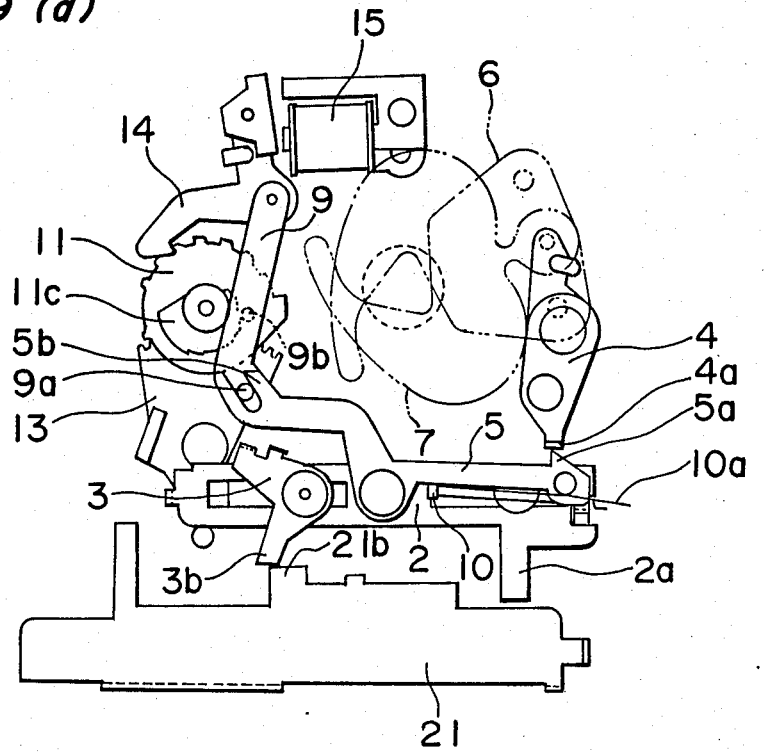

As shown in FIG. 9(c), after one of the pawls 11a of the stop cam 11 has been engaged with the stop pawl lever 14 and the interlocking lever 9 has been stopped by the cam 11c, the engagement through the engagement lever 3 of the shutter plate 2 is released by a control plate 21 as described later so that the shutter plate 2 can run leftwardly by the urging force of the spring. As the shutter drive lever 5 is located in a position where it has pivoted counterclockwise as biased by the urging force of the spring 9d of the interlocking lever 9 at the early stage of the running operation of the shutter plate 2, the hook portion 5b is engaged with the switching lever 4 to pivot the lever 4 clockwise against the urging force to open the shutter blades 6 and 7. On the other hand, when the shutter plate 2 continues to run, the interlocking lever 9 pivots clockwise as biased by the urging force as the fork portion 5b of the shutter drive lever 5 moves leftwardly as shown in FIGS. 9(b) to 9(c), but the clockwise pivot of the interlocking lever 9 is prevented when the pin 9b of the interlocking lever 9 comes into contact with the stepped cam 11c as shown in FIG. 9(d). As the shutter plate 2 slides leftwardly even after the stop of the interlocking lever 9, the shutter drive lever 5 is pivoted clockwise against the urging force because of the depressing of the fork portion 5b by the pin 9a and the hook portion 5a of the shutter drive lever 5 releases the lever 4. The lever 4 released from the hook portion 5a as shown in FIG. 9(e) pivots counterclockwise under the influence of the urging force to close the shutter blades 6 and 7 again. According to the shutter mechanism as described hereinabove, the stop position of the interlocking lever 9 is determined by one of the pawls 11a of the stop cam 11 to be engaged with the stop pawl lever 14, and correspondingly the shutter drive lever 5 pivots clockwise to determine the timing for releasing the lever 4, thereby controlling the opening, the aperture value, of the shutter blades 6 and 7 and the exposure time.

Figure 7:
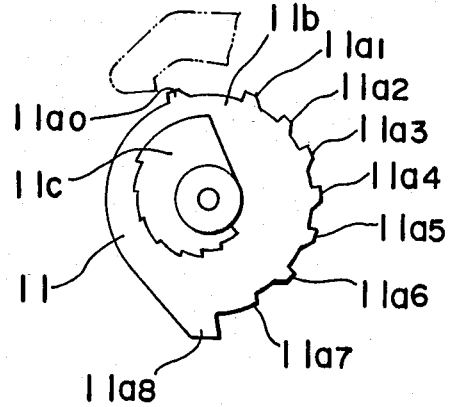
FIG. 7 is a plan view, on an enlarged scale, of a stop cam of FIG. 2.

In the embodiment shown in FIG. 7, the pawl 11a of the stop cam 11 to be engaged with the stop pawl lever 14 and the exposure amount are set so as to provide the relationship as shown in Table 1.

TABLE 1

| Pawl to be engaged | Exposure amount (EV) |
| --- | --- |
| 11a1 | 9 |
| 11a2 | 10 |
| 11a3 | 11 |
| 11a4 | 12 |
| 11a5 | 13 |
| 11a6 | 14 |
| 11a7 | 15 |
| 11a8 | 16 |

Also, when a first pawl 11a0 of the stop cam 11 is engaged with the stop pawl lever 14, the step of the stepped cam 11c integral with the stop cam is maintained in a position pivoted a very small amount counterclockwise from the position shown in FIG. 2, i.e., at a position deviated still from the path of movement of the pin 9b of the interlocking lever 9.

On the other hand, the fan-shaped gear 13 to be interlocked with the stop cam 11 is adapted to stop at a position where the end portion 13c in brought into the path of movement of the end portion 2f of the shutter plate 2. As a result, before the shutter plate 2 being moved is caused to stop by the end portion 13c of the fan-shaped gear 13, the drive lever 5 moves together with the shutter plate 2, and the interlocking lever 9 also continues its clockwise pivot incident to the movement of the drive lever 5 so that the shutter drive lever 5 will not release, but remain engaged with the lever 4 by the hook portion 5a, with the result that the shutter blades 6 and 7 are retained (see FIG. 9(f)) at the full open position till the next succeeding shutter charge is performed. The shutter blades 6 and 7 are opened the maximum amount as described hereinabove, thus allowing the infinite-point adjustment, etc., of the objective lens to be made during the camera assembling operation.

A main release plate 17 coupled with the release button 18, which has an arm portion 17a to be engaged with an auxiliary release plate 19, is supported on the camera main body for movement in the vertical direction in the drawing and is upwardly urged by the spring 17b.

The auxiliary release plate 19 formed at its upper portion with a top end bent portion 19a and a rack portion 19b, and at its lower portion with a projection 19c, is supported on the base plate 1 for sliding movement in the vertical direction and is urged downwardly by a spring 19d exerting a smaller force than the spring 17b of the main release plate 17 so that it is engaged with the arm portion 17a of the main release plate 17, before the picture taking takes place, that is, before the release button 18 is depressed, to stop at a position illustrated.

As the rack portion 19b of the auxiliary release plate 19 is normally engaged with a governor mechanism not shown in FIG. 2, the lowering speed of the auxiliary release plate 19 is controlled to a given speed by the governor mechanism.

A control plate 21 disposed across the the underside of the base plate 1 is supported under the base plate 1 so that it may slide in the left and right directions as viewed in the drawing, and is urged leftwardly as viewed in FIG. 2 (rightwardly as viewed in FIG. 4) by a spring 21a so that it is charged, through the engagement with a winding lever not shown, by the winding lever against the the spring 21a. A engaged portion 21b to be engaged by such a control-plate engagement lever 22 as shown in FIG. 2, a projection 21c to be engaged with the projection 2a of the shutter plate 2, an AE bent portion 21d to be engaged with the pin 13a of the AE fan-shaped gear 13 are provided on the front face of the control place 21 as shown in FIG. 2, while a rack portion 21e coupled to the governor mechanism 23 and a bent portion 21f to be engaged with the pin 35b of an AF fan-shaped gear 35 as shown in FIG. 4 are formed on the rear face of the control plate 21. The fan-shaped gear 13 for AE use is engaged with the gear 11d disposed integrally with the stop cam 11 as described hereinabove and shown in FIG. 6, is urged clockwise by the spring 13b, and is located at a position where the pin 13a can be engaged with the bent portion 21d of the control plate 21. When the control plate 21 moves leftwardly in FIG. 2, it follows the bent portion 21d by the effect of the urging force of the spring 13b to pivot clockwise thereby driving the stop cam 11 counterclockwise. The shutter plate engagement lever 3, which has an engagement portion 3a and an arm 3b on both up and down sides, is urged counterclockwise as viewed in the drawing by the spring, and when the control plate 21 moves leftwardly from the condition where the shutter plate 2 is engaged with the charge position as shown in FIG. 9(a) and the arm portion 3b is depressed by the projection 21b of the control plate 21 (see FIG. 9(b)), it pivots clockwise against the urging force as shown in FIG. 9(c) to release the engagement of the shutter plate 2. On the other hand, as the control plate 21 moves leftwardly as viewed in the drawing during the shutter charging operation to separate the projection 21b from the arm portion 3b of the shutter plate engagement lever 3, the engagement portion 3a comes into elastic contact against the top end face of the shutter plate 2 through the urging force and when the shutter plate 2 then returned by the projection of the controlling plate 21 reaches the charge position, the engagement portion 3a engages the notch portion 2b to engage the shutter plate 2 again (see FIG. 9(a)).

The controlling plate engagement lever 22 shown in FIG. 2, which has on both sides a hook portion 22a and an arm portion 22b with which the engaged portion 21b of the controlling plate 21 located in the shutter charging position is engaged, is urged counterclockwise as viewed in the drawing by the spring (not shown). The control plate engagement lever 22 pivots clockwise against the urging force to release the engagement of the control plate 21, because the arm portion 22b is depressed by the projection 19c disposed on the lower end of the auxiliary release plate 19 when the plate 19 moves downwardly as viewed in the drawing. On the other hand, when the auxiliary release plate 19 restores upwardly while the control plate 21 has moved leftwardly as shown in FIG. 9(d), the arm portion 22b is released from the projection 19c so that the hook portion 22a of the engagement lever 22 comes into elastic contact with the top face of the control plate 21 so as to engage the portion 21b again when the control plate 21 has been returned to the shutter charging position shown in FIG. 9(a).

The BC lock lever 25, which is provided on both its upper and lower sides, a notched arm portion 25a to be engaged with the top end bent portion 19a of the auxiliary release plate 19, and an arm portion 25b, is urged clockwise as viewed in the drawing by the spring 25c and, in FIG. 2, the tip end portion of the notch arm portion 25a is in elastic contact with the top-end bent portion 19a of the auxiliary release plate 19. The lever 26 is provided, on both left and right sides with a pin 26a and an arm portion 26b engageable with the arm portion 25b of the BC lock lever 25, and the arm portion 26b is coupled to the magnetizeable member 14b of the stop pawl lever 14 through the link 27. The urging force of the spring 25c of the BC lock lever 25 is applied in a direction along which the member 14b is caused to leave from the magnet 15 for AE use through the lever 26 and the link 27. As the operating force of the spring 25c which causes the member 14b to leave from the magnet 15 is greater than the operating force of the spring 14c which directly operates to pivot the stop pawl lever 14 clockwise, the member 14b is caused to leave from the magnet 15 for AE use when the magnet 15 receives the operating force caused by this spring 25c while the magnetic attraction is released.

When the auxiliary release plate 19 moves downwardly as viewed in the drawing from the condition of FIG. 2, a power switch SW1 is closed to actuate an AE magnet control circuit, described later, to turn the AE magnet 15 into an attracting condition so that the member 14b is attracted against the operation force of the spring 25c. Thereafter, when the AE magnet 15 is put into a non-attracting condition by the AE magnet control circuit, the stop pawl lever 14 pivots counterclockwise due to the operation force of the spring 25c to engage one of the pawls 11a of the stop cam 11 through the hook portion 14a. Thereafter, when the auxiliary release plate 19 together with the main release plate 17 is restored to an upward position by the force of the spring 17b, the BC lock lever 25 pivots counterclockwise against the urging force of the spring 25c because of the BC lock lever 25 depressed by the top-end bent portion 19a of the auxiliary release plate 19a so that the lever 26 is released from the BC lock lever 25 and the stop pawl lever 14 pivots clockwise because of the urging force of the spring 14 thereby to cause the member 14b to come into elastic contact with the AE magnet 15. On the other hand, when the AE magnet 15 is not put into the attracting condition due to the drop of the power voltage of the camera, the BC lock lever 25 remains in elastic contact with the bent portion 19a even if the auxiliary release plate 19 begins to lower and thus a projection 25d right under the notch arm portion 25a engages the bent portion 19a to prevent the auxiliary release plate 19 from moving downward so that the shutter releasing operation is not effected.

Referring to FIG. 3 and FIG. 4, the lens shifting mechanism for an auto-focus control mechanism provided on a barrel base plate 10 has a control cam 30, an AF fan-shaped gear 35, a stop pawl lever 31, and an magnetizeable lever 33, and a shifting control means has a conductive pattern 46 (shown in FIG. 8), a sliding brush 43, a gear 38, etc.

The lens control cam 30, which is of a ring shape, is provided on its outer periphery with a series of engaging steps $30a1$, $30a2$, $30a3$ and $30a4$, and a projected portion 30b, and on its other side with a gear portion 30c, is supported on the base plate 10 for its free pivot about an optical axis. A cam portion 30d is provided on its inner peripheral face with being inclined in the direction of the optical axis of the objective lens, a conventionally known moving mechanism for moving the lens in the direction of the optical axis through the depression of the focusing lens of the objective lens against the cam portion 30d. The stop pawl lever 31 pivots on the shaft of the base plate 10, has a pawl 31b on an arm portion 31a and is urged counterclockwise as viewed in the drawing by a spring 31c. When the step pawl $30a1$ of the lens control cam 30 is engaged with the pawl 31b of the stop pawl lever 31, the focusing lens element of the objective lens system is adjusted to be located on a position in which the objective lens system is focused to the nearest focusing condition zone EN shown in FIG. 18. Namely, in this condition, the objective lens system is focused with respect to the position D (for example, the position of 0.8 m away from the camera) shown in FIG. 18. On the other hand, when the step pawl $30a2$ is engaged with the pawl 31b, the objective lens system is adjusted to be focused to the near focusing condition zone N, that is, the objective lens system is focused with respect to the position C (for example, the position of 1.1 m away from the camera).

Similarly, when the step pawl $30a3$ is engaged with the pawl 31b, the objective lens system is focused to the middle focusing condition zone M, that is, to the position B (for example, the position of 1.7 m away from the camera). When the step pawl $30a4$ is engaged with the pawl 31b the objective lens system is focused to the farest focusing condition zone F (for example, the position of 4.0 m from the camera). The lever 33 mounted pivotally on the shaft of the base plate 10 has a magnetizeable member 33a to be attracted by the AF magnet 34 of the focusing stop mechanism, and an arm portion 33b on both sides, and is urged counterclockwise as viewed in the drawing by the spring 33c.

The AF fan-shaped gear 35 mounted pivotally on the shaft of the base plate 10 has a gear portion provided on the outer periphery and engaged with the gear portion 30c of the lens control cam 30 and is urged counterclockwise as viewed in the drawing by the spring 35a. The AF fan-shaped gear 35 also has a pin 35b disposed on the lower end and brought into elastic contact with the bent portion 21f of the control plate 21. When the control plate 21 slides rightwardly as viewed in the drawing from the shutter charge position shown in FIG. 4, the pin 35b follows the bent portion 21f by the effect of the spring force to cause the AF fan-shaped gear 35 to pivot counterclockwise to pivot the lens control cam 30 clockwise.

When the lens control cam 30 pivots clockwise from the condition of FIG. 4 in this manner, the pawl 31b of the stop pawl lever 31 which was held in elastic contact with the projection portion 30b so far leaves from the projection portion 30b, but when the AF magnet 34 is put into the attracting condition, the member 33a is attracted to prevent the lever 33 from performing the clockwise pivoting operation so that the arm portion 33b of the lever 33 engages the arm portion 31a of the stop pawl lever 31 to prevent the stop pawl lever 31 from pivotting counterclockwise, with the result that the pawl 31b will not engage the next step 30a of the lens control cam 30. When the lens control cam 30 pivots as far as the focusing position in the control of the AF magnet control circuit described later, the AF magnet 34 is put into the non-attracting condition and the stop pawl lever 31 pivots counterclockwise against the urging force of the spring 33c by the urging force of the spring 31c to cause the pawl 31b to engage one of the steps 30a to stop the lens control cam 30, thus stopping the focusing lens, operatively cooperating with the lens control cam 30, in the in-focus position.

Figure 8:
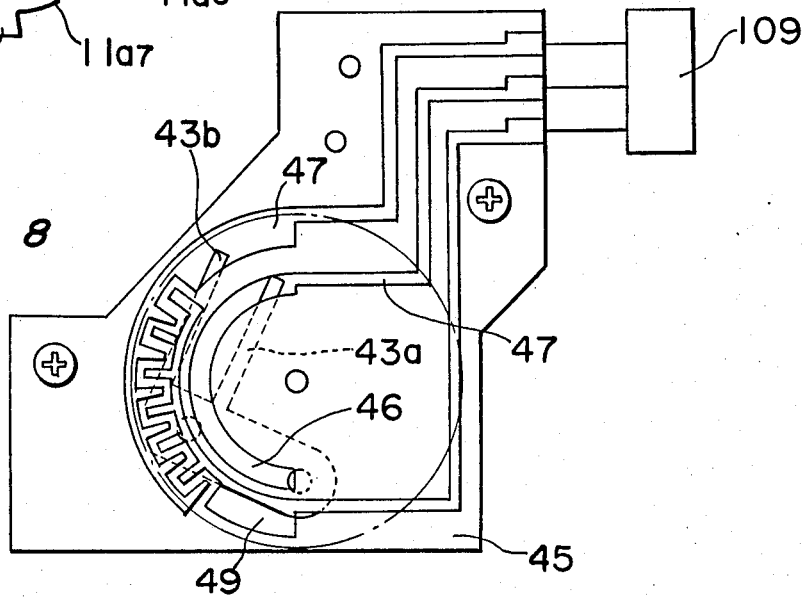
FIG. 8 is a plan view, on an enlarged scale, of a signal base plate of FIG. 4.

FIG. 4 shows a gear 38 operatively cooperating with the control plate 21 as a displacement mechanism, and a sliding brush 43 and conductive patterns 46, 47 and 49 shown in FIG. 8 are provided as a position signal output device.

The rack portion 21e of the control plate 21 disposed on the underside of the base plate 10 is engaged with the gear 37 pivoted on the shaft of the base plate 10. A gear 39 to be engaged with a gear 38 integrally formed coaxially with the gear 37 is integrally formed coaxially with an escape wheel 41, and the rack portion 21e is coupled to the escape wheel 41 through the gears 38 and 39. As the pivoting operation of the escape wheel 41 mounted pivotally on the base plate 10 is damped by an ankle 42 fixed on the base plate 10, the control plate 21 slides rightwardly or leftwardly at a given speed because of the damping operation of the escape wheel. The sliding brush 43 for an ehcoder is fixedly disposed on one surface of the gear 38. The sliding brush 43 slides in contact with the conductive patterns 46, 47 and 49 provided on such a base plate 45 as shown in FIG. 8 disposed on the gear 38. The conductive pattern 46 disposed on the base plate 45 is formed in a arcuate shape and is connected to the output terminal; the conductive pattern 47 is formed into a circular comb-like shape having seven teeth and is connected with a low potential terminal; and the conductive pattern 49 is alternately combined with a conductive pattern 47 to form a circular comb-like shape having seven teeth disposed in a generally U-shaped configuration and is connected to a high potential terminal. One contact segment 43a of the sliding brush 43 for the encoder normally comes into sliding contact with the conductive pattern 46, while the other contact segment 43b is alternately brought into sliding contact with the contact pattern 47 and the conductive pattern 49 and is formed so that it will come into sliding contact with either one among the comb teeth of both the conductive patterns. Accordingly, a signal to be outputted through the sliding brush 43 from the output terminal of the conductive pattern 46 will be of a generally comb-shaped waveform as shown by (b) in FIG. 12.

A stop cam 11 and a lens control cam 30 disposed respectively on the front and rear faces of the base plate 1 described hereinabove are connected with the control plate 21 through the AE fan-shaped gear 13 and the AF fan-shaped gear 35 until each operation is engaged with, and the sliding brush 43 is connected with the control plate 21 through the gears 38 and 37 so that the pivotal positions of the stop cam 11 and the lens control cam 30 can be detected through detection of a signal formed by the sliding contact between the sliding brush 43 and the conductive patterns 46, 47 and 48, because the stop cam 11 and the lens control cam 30 are apparently connected with the sliding brush 43.

Furthermore, FIG. 1 shows a synchroswitch 10 and a pin 5d of a shutter drive lever 5 for switching it. The synchroswitch 10, which has a contact segment 10a, a contact segment 10b which come into elastic contact on the pin 5d, is secured to the fixed portion of the camera. Once the shutter plate 2 begins to run, the pin 5d slides on the contact segment 10a. When the pin 9b of the interlocking lever 9 comes into contact with the stepped cam 11c to cause the shutter drive lever 5 to pivot clockwise, the contact segment 10a is depressed with the pin 5d to come into contact with the contact segment 10b so that the synchroswitch 10 is closed to initiate the flash.

It is to be noted that a similar operational effect can be appreciated even if the sliding brush is adapted to sequentially shortcircuit these resistors connected in series or parallel in place of the conductive patterns shown in FIG. 8.

Also, FIG. 10 shows modified examples of the main release plate 51 and the auxiliary release plate 52. In FIG. 10, the main release plate 51, which has an arm portion 51a, is upwardly urged by the spring 51b. The lever 53 mounted pivotally through a pin, has an arm portion 53b and an arm 53a positioned on the path of downward motion of the arm portion 51a of the main releasing plate 51, and is urged clockwise as viewed in the drawing by the spring 53c to come to a stop in elastic contact with a fixed pin 54. At this time, the arm portion 53b of the lever 53 is brought into the path downward motion of the bent portion 52a of the auxiliary release plate 52. The auxiliary release plate 52 is urged downwardly as viewed in the drawing by a spring 52b exerting a smaller force than a spring 51b. As the bent portion 52a of the auxiliary release plate 52 is pushed upwardly by an arm portion 51a of the main release plate 51, as shown in FIG. 10, before the shutter release operation, the auxiliary release plate 52, which is located in an upward position, follows the arm portion 51a of the main release plate 51 and is moved downwards by the urging force of the spring 52b when the main release plate 51 is downwardly depressed. Thereafter, the bent portion 52a of the auxiliary release plate 52 comes into contact with the arm portion 53b of the lever 53 and is once prevented from the downward motion, and when the main release plate 51 is further depressed, the arm portion 51a causes the lever 53 to pivot counterclockwise against the spring 53c to disconnect the engagement between the arm portion 53b and the bent portion 52a so that the auxiliary release plate 52 moves downwardly because of the urging force of the spring 52b to release the engagement of the control plate 21 shown in FIGS. 1 through 9.

Accordingly, the force required to depress the main release plate 51 changes and the power switch SW1 can be closed with no need to release the engagement of the control plate.

The electric circuit will be described with reference to FIGS. 11 through 18.

Figure 11:
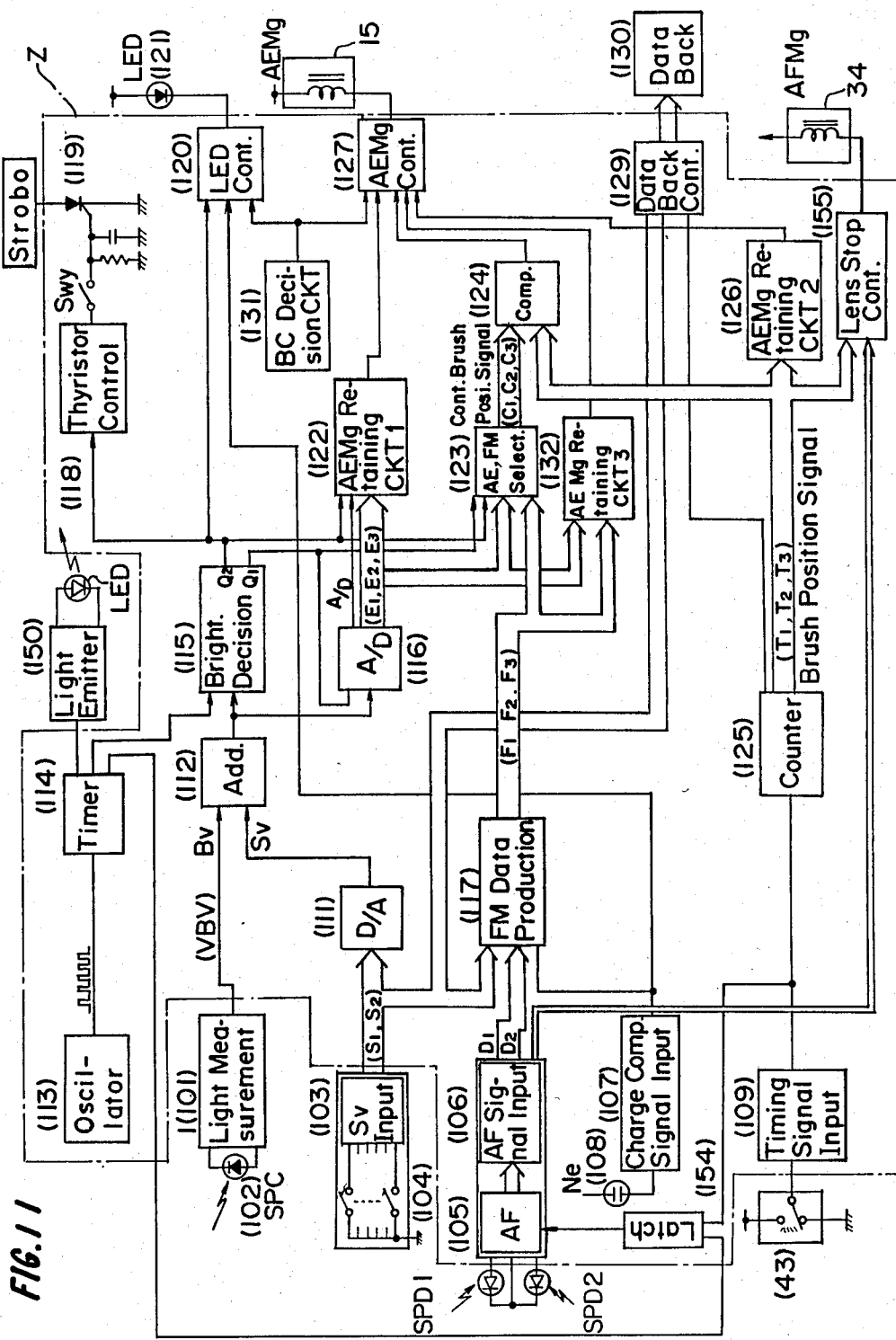
FIG. 11 is a control circuit diagram built-in in the shutter base plate of FIG. 1.

In the control circuit Z of the shutter mechanism shown in FIG. 11, the main release plate 17 is depressed upon the depression of the release button (not shown) and the auxiliary release plate 19 follows it so that the power switch SW1 is turned on by the descent of the plate 19 to feed the power to the entire control circuit. At the early stage of the power supply which has been initiated, a reset circuit (not shown) operates to reset each portion of the control circuit to a respective initial condition. For 20 milliseconds after the switch SW1 has been turned on, the input of the lens position signal is prohibited to wait for the stability of the main integrated circuit. After 40 to 50 milliseconds subsequent to the switching-on of the switch SW1, the LED of a luminous portion 150 emits a light pulse, and a brightness signal and a distance measuring signal are outputed upon the termination of the flash.

A light receiving element 102 is incorporated in the light measuring circuit 101 of the light measuring device and the brightness information of an object to be photographed which has been inputted into the light receiving element 102 is outputted as the logarithm-compressed voltage information $V_{BV}$ of photocurrent $I_L$ through a known method using a diode.

On the other hand, the film sensitivity information $S_V$ is inputted into a $S_V$ input portion 103 as a digital signal from a film sensitivity setting means 104, and the film sensitivity information set by the film sensitivity setting means 104 is converted into a form suitable for exposure control in the $S_V$ input portion 103 and is then outputted (S1, S2) in the form of digital information. It is to be noted that the film sensitivity information may be manually set or may be data-read from a film container.

A distance signal from the distance measuring device is inputted to an AF signal input portion 106 as a digital zone signal from the AF circuit 105 of a separate block. A pair of light receiving elements are used in the AF circuit 105, and a distance zone is determined through a ratio in the photocurrent between the light receiving elements SPD1 and SPD2, the signal indicative of the distance zone being then stored in the AF signal input portion 106 for memorizing the detected zone. In the AF signal input portion 106, the distance signal is converted into a form suitable for the exposure control and is outputted in the form of digital information D1, D2.

A charging-completion signal input portion 107 is connected with a main capacitor (not shown) of a strobo-circuit through a neon tube 108. When the voltage of the main capacitor attains a given value or higher, the neon tube 108 is lit, which is detected by the charging-completion signal input portion 107 to output an "L" level signal as a charging-completion signal.

Furthermore, the timing signal input portion 109 shapes in wave-form the pulse signal from the sliding brush 43 disposed on the gear 38 of the auto-focusing mechanism, described in connection with the mechanical arrangements, to output it to the exposure control circuit and the AF circuit of the separate block. The timing of each pulse corresponding to the pivotal position of the stop cam 11 corresponds to an exposure value ($E_V$ value) of the shutter and an aperture value (an aperture value during a so-called flashmatic (FM)) corresponding to the distance during the flash photography as shown in Table 2.

TABLE 2

| Brush Position | Brush Position Signal | | | $E_v$ Value | FM Aperture Value ($F_{NO}$) |
| --- | --- | --- | --- | --- | --- |
| | T1 | T2 | T3 | | |
| 0 | L | L | L | — | — |
| 1 | H | L | L | 9 | 3.5 |
| 2 | L | H | L | 10 | 4.0 |
| 3 | H | H | L | 11 | 4.8 |
| 4 | L | L | H | 12 | 5.8 |
| 5 | L | H | H | 13 | 8 |
| 6 | L | H | H | 14 | 9.9 |

TABLE 2-continued

| Brush Position | Brush Position Signal | | | $E_v$ Value | FM Aperture Value ($F_{NO}$) |
| --- | --- | --- | --- | --- | --- |
| | T1 | T2 | T3 | | |
| 7 | H | H | H | 15 | 12.5 |
| 8 | H | H | H | 16 | 25.5 |

A DA conversion circuit 111 outputs, to an adding circuit 112, a digital signal indicative of the film sensitivity outputted from the $S_V$ input portion 103 in the form of analog the voltage information $V_{SV}$.

In the adding circuit 112, the brightness information $V_{BV}$ outputted from the light measuring circuit and the film sensitivity information $V_{SV}$ outputted from the D/A conversion circuit are added and are outputted as the exposure information $V_{EV}$ to a brightness decision circuit 115 and an A/D conversion circuit 116.

An oscillation circuit 113 starts to oscillate, at the same time when the power is supplied, to output a train of pulses. A timer 114 counts the pulse train to output an "H" level signal to the radiation portion and the brightness decision circuit after a given time, calculating time required for the output of the light measuring circuit 101 to be stabilized after the power has been put to supplied.

The brightness decision circuit 115 receives the "H" level signal from the timer 114 to input the output $V_{EV}$ from the adding circuit 112, and decides that it is light, when the output $V_{EV}$ is higher than a given value, thereby generating a "H" level signal from the Q1 output terminal (which is referred to as mode 1 hereinafter), and decides it is dark, when the output $V_{EV}$ is lower than the given value, thereby generating a "H" level signal from the Q2 output terminal (which is referred to as mode 2 hereinafter).

In the mode 1, the A/D conversion circuit 116 receives the "H" level signal of the brightness decision circuit 115 for the A-D conversion of the exposure information $V_{EV}$ from the adding circuit 112 to output it as the $E_V$ control signal E1, E2, E3, E4 as shown in Table 3, while in the mode 2, the A-D conversion is prohibited by the "L" level signal from the output terminal Q1 of the brightness decision circuit 115.

TABLE 3

| $E_V$ Value | $E_V$ Control Signal | | | |
| --- | --- | --- | --- | --- |
| | E1 | E2 | E3 | E4 |
| 8 and lower | L | L | L | L |
| 9 | H | L | L | L |
| 10 | L | H | L | L |
| 11 | H | H | L | L |
| 12 | L | L | H | L |
| 13 | H | L | H | L |
| 14 | L | H | H | L |
| 15 | H | H | H | L |
| 16 and higher | L | L | L | H |

An Fm data producing portion 117 outputs, as FM control signals (F1, F2, F3), an aperture value of the flashmatic in the mode 2 to the AE, FM selection circuit 123 and the AEMg retaining circuit 3 in response to the presence of the ASA digital signal, the distance digital signal and the charging completion signal as shown in Table 4.

TABLE 4

| (7) OUTPUT | (3) OUTPUT ASA | S1 | S2 | AF (6) OUTPUT D1=L D2=L F FM Control Signal F1 F2 F3 | D1=H D2=H M FM Control Signal F1 F2 F3 | D1=L D2=H N FM Control Signal F1 F2 F3 | D1=H D2=L EN FM Control Signal F1 F2 F3 | ← C1,C2,C3 |
|---|---|---|---|---|---|---|---|---|
| L | 100 | H | H | H L L | L H L | L L H | H L H | |
|   | 200 | L | H | H L L | L L H | H H H | H H H | |
|   | 400 | H | L | H L L | H L H | H H H | L L L | |
|   | 800 | L | L | H H L | H H H | L L L | L L L | |
| H | — |   |   | H L L | H L L | H L L | L L H | |

A thyristor control circuit 118 outputs an "H" level signal to the gate terminal of a thyristor 119 for driving the xenon tube of the strobo-circuit (not shown) when the brightness decision circuit 115 selects the mode 2, the Q2 output terminal outputs the "H" level signal and the switch 10 is released.

The LED control circuit 120 lights the LED disposed within a finder to warn a photographer of low brightness and insufficient charging in accordance with the "H" level signal from the output terminal of Q2 where the brightness decision circuit 115 has selected the mode 2 with the output of the BC decision circuit 131 being at the "H" level (BCOK), and the "H" level signal indicative of the insufficient charging of the strobo fed from the charge-completion signal input portion 107.

An AEMg retaining circuit 1 (122) outputs to the AEMg control circuit 27 a retaining signal for an AE magnet 15 as the exposure stop mechanism in accordance with the output of the brightness decision circuit 115 and the output of the A/D conversion circuit 116. The AEMg retaining circuit 122 outputs the retaining signal for the AE magnet 15 respectively in three cases; in the first case, during the time required for the AD completion signal to be inputted when the brightness decision circuit 115 has selected the mode 1, and in the third, when the high brightness non-interlocking signal has come from the A/D conversion circuit 116 when the mode 1 has been selected.

The AE.FM selection circuit 123 outputs, to a large/small comparison circuit 124, the output $E_V$ control signals E1, E2, E3 from the A/D conversion circuit 116 during the mode 1, in accordance with the output from the brightness decision circuit 115, and the output FM control signals F1, F2, F3 from the FM data production portion during the mode 2, as the control brush portion signal C1, C2, C3.

A counter 125 receives the pulse signal from the timing signal input portion 109 to output to a databack control circuit 129 a copying signal and a digital signal in accordance with the positions of the stop cam 11 and the lens control cam 30. The counter 125 also outputs the timing control signals T1, T2, T3 as a brush position signal to the large/small comparison circuit 124, the AEMg retaining circuit 126 and the lens stop control circuit 155.

The large/small comparison circuit 124 compares the control brush position signal from the AE.FM selection circuit 123 with the brush position signal from the counter 125 and then outputs the AEMg OFF signal of such an "L" level as shown in Table 5 when the control brush position signal is lower than or equal to the brush position signal. It is to be noted that the sign of inequality in the above described relationship may be reverse depending upon the mechanical construction of the mechanical portion.

TABLE 5

| Brush Position | Brush Position T1T2T3 | Output from Comparison Circuit 24 Control Brush Position Signal C1C2C3 H L L | C1C2C3 L H L | C1C2C3 H H L | C1C2C3 L L H | C1C2C3 H L H | C1C2C3 L H H | C1C2C3 H H H | ← E1E2E3 (F1F2F3) |
|---|---|---|---|---|---|---|---|---|---|
| 1 | H L L | H | L | L | L | L | L | L | |
| 2 | L H L | H | H | L | L | L | L | L | |
| 3 | H H L | H | H | H | L | L | L | L | |
| 4 | L L H | H | H | H | H | L | L | L | |
| 5 | H L H | H | H | H | H | H | L | L | |
| 6 | L H H | H | H | H | H | H | H | L | |
| 7 | H H H | H | H | H | H | H | H | H | |

The AEMg retaining circuit 2 (126) outputs a retaining signal for the AE magnet 15 when the pulse signal from the timing signal input portion 9 is not inputted to the counter 125, the initial setting is performed by the reset circuit (not shown) and all the "L" level signal is outputted.

The AEMg retaining circuit 3 (132) outputs a retaining signal for the AE magnet 15 when the signals E1 to E3 of the $E_V$ control signals, and the FM control signal (F1 to F3) have all become the "L" level.

The AEMg control circuit 27 retains the energization of the AE magnet 15 while the retaining signals for the magnet is outputted from three AEMg retaining circuits 1 (122), 2 (126), 3 (132) with the output of the BC decision circuit 131 being at the "H" level (BCOK). After the retaining signal for the AE magnet 15 has been released, the large/small comparison circuit 124 stops the energization of the AE magnet 15 when the AEMg OFF signal of the "H" level has been outputted.

The databack control circuit 129 transmits a film sensitivity and a copy signal to the databack 130 of the separate block in accordance with the copy signal from the counter 125 and the digital signal indicative of the film sensitivity from the $S_V$ input portion 103. The lens stop control circuit 155 turns off the AF magnet 34 when a lens position signal is fed from the AF light receiving portion 105 (to be described later), and a constant number of timing signals have been fed from the counter 125, to fix the focusing lens to a given zone corresponding to the lens position signal.

A BC decision circuit 131 outputs an "H" level signal when the battery check indicates OK, and an "L" level signal when the battery check indicates NO.

Figure 12:
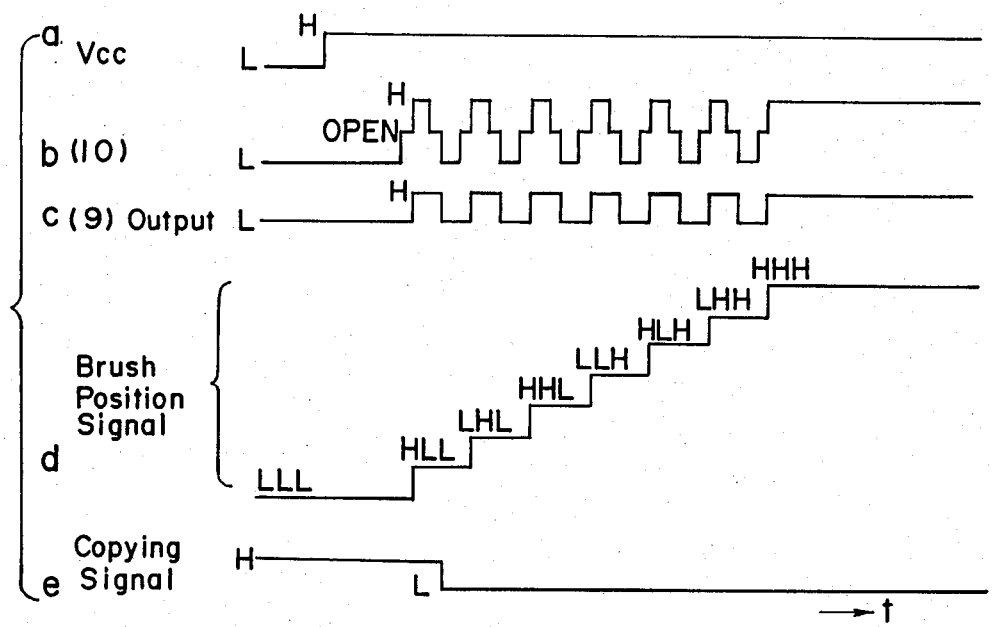
FIG. 12 is a time chart of signals appearing in FIG. 11.
Figure 13:
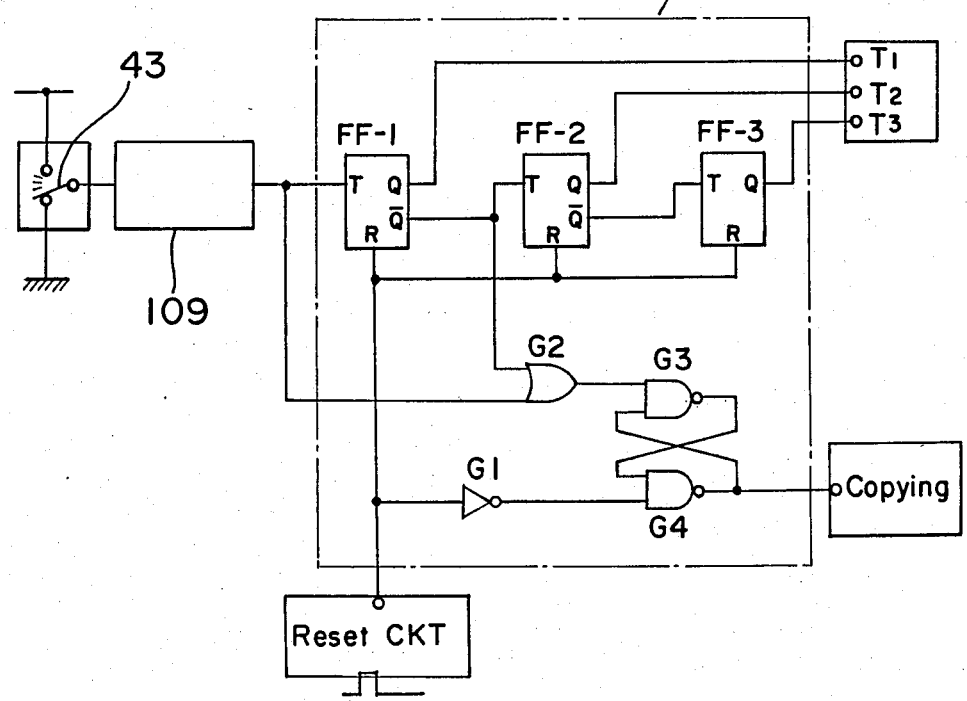
FIG. 13 is a detailed diagram showing the counter of FIG. 11.

FIG. 13 shows the circuit construction of the counter 125 in detail. When the power is fed to this circuit, the reset signal is inputted from the reset circuit (not shown) to reset T flip-flops FF1 through FF3 and R-S flip-flops composed of G3 and G4 so that the brush position signals are initially set to the "L" level and the copying signal to the "H" level as shown in FIG. 12. Then, when the control plate 21 starts to run, a waveform of pulse signals shown by (b) in the time chart of FIG. 12 is inputted to the timing signal input portion 109 from the sliding brush 43 and, in the timing signal input portion 109, the pulse signal is shaped and outputted to the next stage of counter 125 (See (c) in FIG. 12).

Within the counter 125, the brush position signals are sequentially outputted as T1 through T2 in synchronism relation with the set-up of the pulse signal through the FF1 through FF3, while the copy signal, after the $\overline{Q}$ output from FF-1 has become a "L" level in response to the initial set-up signal from the timing signal input portion 109, sets the R-SFF of G3 and G4 in response to said signal and an OR circuit G2, which is then in the "L" level in response to the set-up of the input portion 109, thereby to switch the copying signal, which is an output from G4, over to an "L" level to transmit to the databack control circuit 129.

Figure 14:
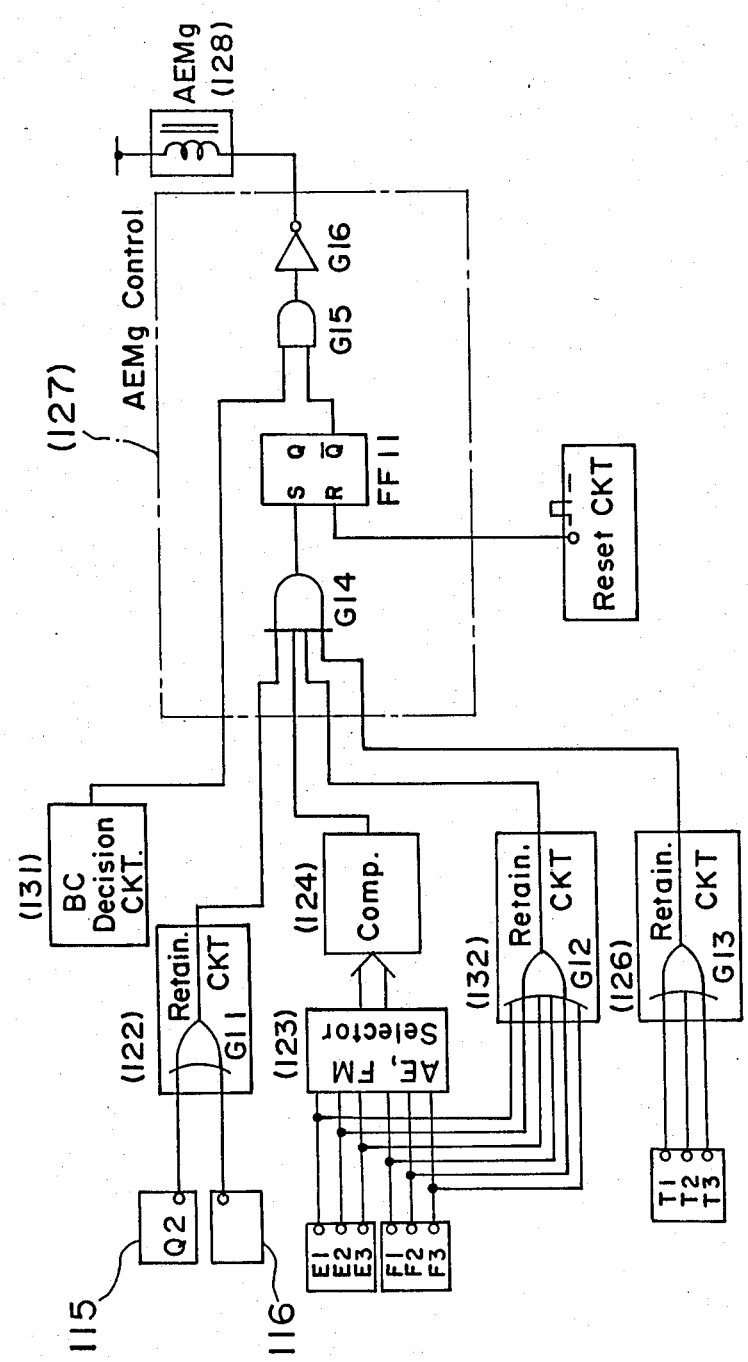
FIG. 14 is a detailed diagram of an AEMg control circuit of FIG. 11.

FIG. 14 shows the circuit construction of the AEMg control circuit 127. Once the power is fed to the circuit, a reset signal is inputted from a reset circuit (not shown) to reset the RS flip-flop FF11 so that the "H" level signal is outputted from the $\overline{Q}$ output. If the power voltage is a normal or higher value at this time, the "H" level signal is inputted to an AND gate G15 from the BC decision circuit 131, and the "L" level signal is outputted from the AEMg control circuit 127 through an inverter G16 thereby retaining the AE magnet.

Each output of three AEMg retaining circuits 1 through 3 (122), (126), (132), and the output of the large/small comparison circuit 124 are inputted to the input AND gate G14 of the AE control circuit 127. When all the inputs have become "H" level, the AND gate G14 sets the RS flip-flip FF11 to turn the input of the AND gate G15 into "L" level and the output of the inverter G16 into "H" level, thereby releasing the retention of the AE magnet 15.

Accordingly, when either one of said four inputs is "L" level, the flip-flip FF11 remains reset, because the AND gate G14 outputs an "L" level signal. Namely, the AE magnet 15 is kept energized.

Three AEMg retaining circuits 1 through 3 (122), (126), (132) are respectively composed of OR gates each having many inputs. The Q2 output of the brightness decision circuit 115 is inputted to the AEMg retaining circuit 122, while and A/D completion signal showing the completion of the analog/digital conversion and an E4 signal showing the non-interlocking of the light measuring at the high brightness are fed from the A/D conversion circuit 116 to the AEMg retaining circuit. When the power is on, the input of the OR gate G11 is initially set to the "L" level through the operation of the reset circuit (not shown).

In a first case, where the brightness decision circuit 115 has selected a mode 2 in response to the signal of the time 114, the Q2 output of the brightness decision circuit 115 changes from "L" level to "H" level. Accordingly, the "H" level signal is outputted from the OR gate G11 to release the retention of the AE magnet by the AEMg retaining circuit 1 (122).

In a second case, where the brightness decision circuit 115 has selected a mode 1 in response to in response to the signal of the timer 114, the Q2 output of the brightness decision circuit 115 remains at the "L" level. At this time, the A/D conversion circuit starts its operation to effect an AD conversion as shown in Table 3 to convert the brightness information $V_{EV}$ into the digital amount thereby to output a signal of $E_v$ 16 or more with the AD conversion completion signal (which changes from the "L" level to the "H" level) or the E4 signal being at the "H" level so as to stop the analog-to-digital conversion. Accordingly, the OR gate G11 outputs "H" level when the AD conversion has completed or the signal has become $E_V$ 16, to release the retention of the AE magnet through the AEMg retaining circuit 1 (122).

The $E_V$ control signals (E1 through E3) and the FM control signals are inputted to the AEMg retaining circuit 3 (132). Accordingly, when the signal of F1=F2=F3="L" level has been inputted from the FM control signal in the case of the mode 2 (E1 through E3="L" level), the OR gate 112 outputs the "L" level to retain the AE magnet.

Brush position signals (T1 through T3) are inputted to the AEMg retaining circuit 2 (126). Accordingly, when the brush 3 is at an initial position (winding completion position), all of the signals T1 through T3 are in "L" level to keep the AE magnet energized. When the sliding brush 43 starts its movement incident to the release operation, and the counter 125 starts counting, either one of the brush position signals (T1 through t3) becomes "H" level. The "H" level signal is outputted from the OR gate 113 to release the retention of the AE magnet through the AEMg retaining circuit 2 (126).

Figure 15:
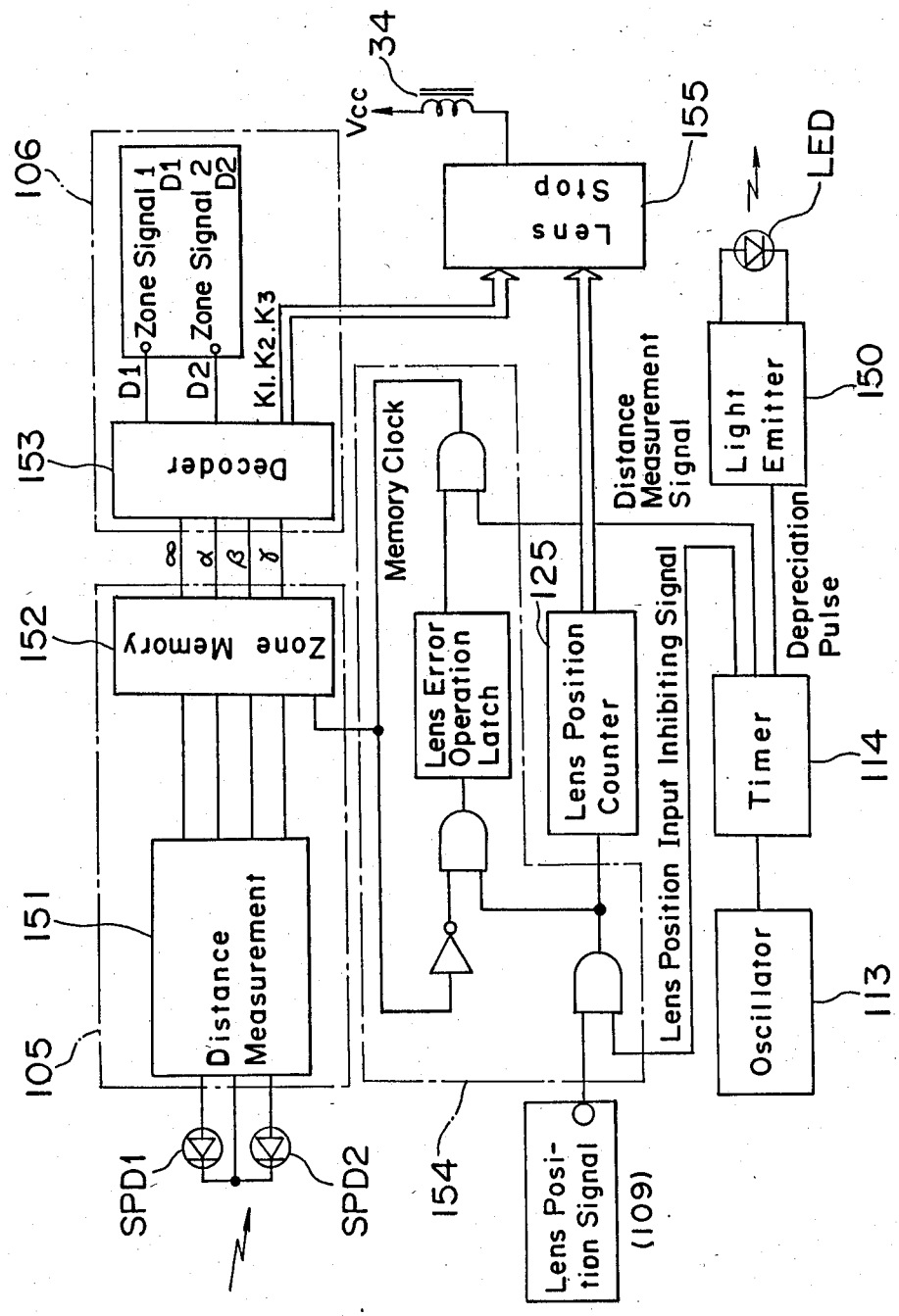
FIG. 15 is a detailed diagram of a lens stop control circuit of FIG. 11.

FIG. 15 shows the circuit construction of the lens stop control circuit in detail. When the power is fed to this circuit, each portion is simultaneously reset by the reset circuit (not shown) into the initial condition. In the initial condition, the output of the decoder 153 produces the signal of the intermediate distance Namely, in FIG. 16, when a reset signal is inputted to the reset input terminal (RE), the high level output from the $\overline{Q}$ output of the RS flip-flop 149 is fed to the input terminals $\beta$, $\gamma$). Namely, a signal showing a zone M as described later is inputted (see FIG. 6). On the other hand, when a memory clock pulse is inputted from the terminal (ST), the RS flip-flop 149 is reversed so that the $\overline{Q}$ terminal produces a low signal.

Figure 16:
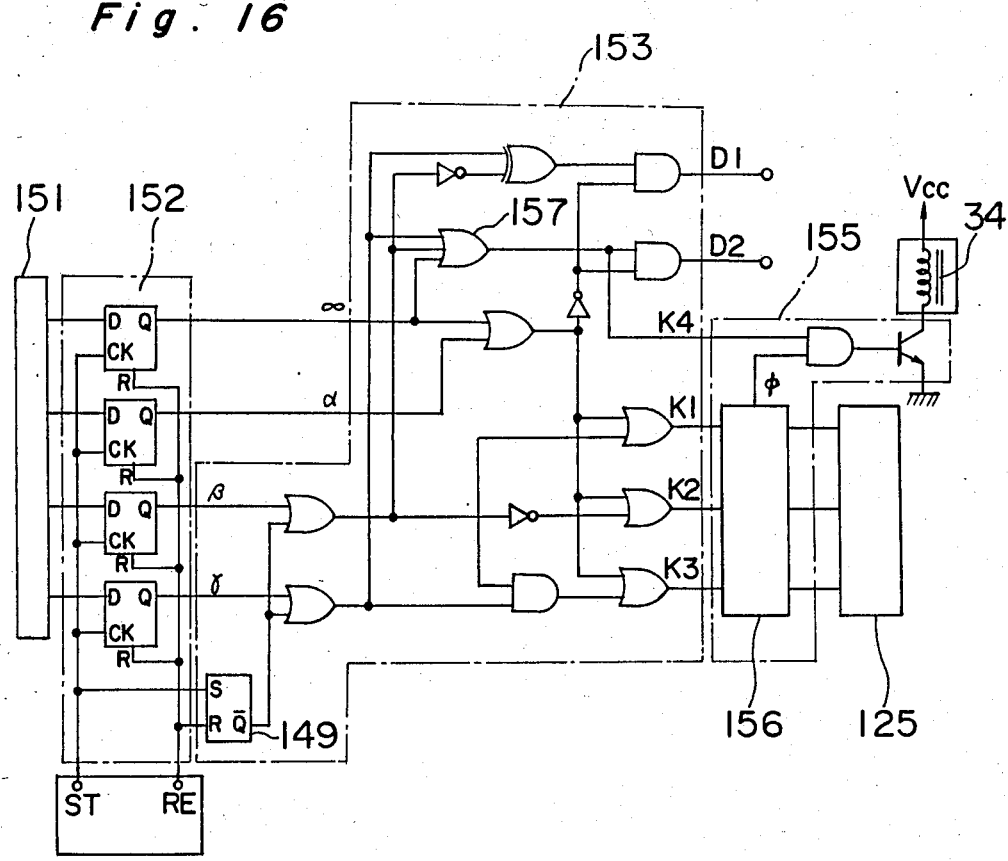
FIG. 16 is a circuit diagram of a decoder of FIG. 15.
Figure 18:
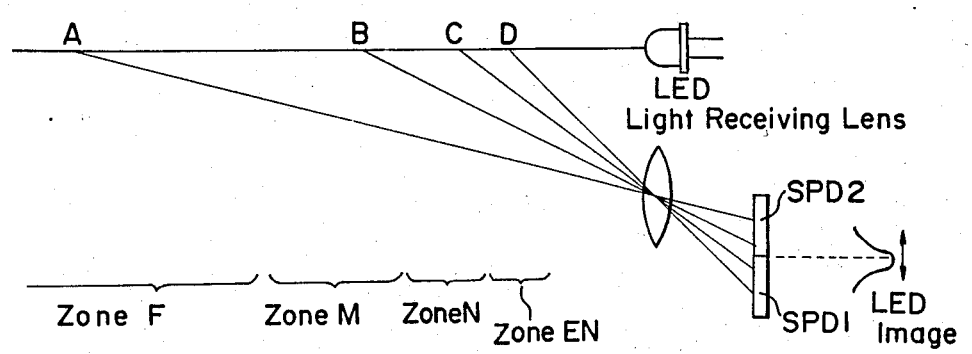
FIG. 18 is a view illustrating a zone.

As a lens position input prohibition signal of the low level is outputted from the terminal (a) of the timer circuit 114 for 20 microseconds subsequent to the initiation of the power supply, the gate G30 is closed to prohibit the inputting of the lens position signal to the lens position counter 125. This is for the purpose of enabling the main integrated circuit to be stabilized. A distance measuring LED of the radiation portion 150 emits a light pulse in accordance with a signal from the terminal c of the terminal circuit 114 or after 50 microseconds subsequent to the power supply. A distance measuring completion signal from the terminal c of the timer circuit 114 is transmitted after the radiation completion. At this time point, a lens error operation latch circuit 160 keeps the gate G31 open and the distance measuring completion signal is outputted as a memory clock signal. At this timing, the distance zone is determined by the ratio of the reflection photocurrent between the light receiving elements SPD1 and SPD2 of the distance measuring portion 151, and a signal showing the distance zone is memorized in the zone memory 152. Table 6 shows an input signal and an output signal of the decoder 153. Also, FIG. 16 shows the circuit of the decoder 153 in detail, and FIG. 18 shows the relationship between the position of an object and the distance zone. For example, assume that an object was located in each position of A, B, C, D respectively in the diagram of FIG. 18.

As shown in Table 6, signals of 111 (=7), 101 (=5), 010 (=2) are outputted from the terminals K1, K2, K3 when the distance zones are F, M, N, respectively.

TABLE 6

| | | Zone | | | |
|---|---|---|---|---|---|
| | Terminal | F | M | N | EN |
| Input | ∞ | H | L | L | L |
| Signal | α | * | H | L | L |
| | β | * | H | H | L |
| | γ | * | H | H | H |
| Output | D1 | L | H | L | H |
| Signal | D2 | L | H | H | L |
| | K1 | 1 | 1 | 0 | * |
| | K2 | 1 | 0 | 1 | * |
| | K3 | 1 | 1 | 0 | * |

The comparison circuit 156 of the lens stop circuit 155 shown in FIG. 16 changes the output of the output terminal φ from high to low, when the count number of the lens position counter 125 has coincided with the number represented with the signals at the terminals K1, K2, K3 or has exceeded such number, to separate the AF magnet 34 as the focusing stop mechanism. On the other hand, as the low signal is outputted from the terminal K4 of the decoder when the distance zone is an EN, the AF magnet 34 is turned off before the lens position signal is inputted, the pawl 31b of the stop pawl lever 31 is engaged with the step 30a1 of the lens control cam 30. When the zone is the EN, the AF magnet 34 is turned off and the pawl 31b of the stop pawl lever 31 is engaged with the step portion 30a2 of the lens control cam 30 if the counter 125 has counted 2. When the zone is the M, the AF magnet is turned off and the pawl 31b of the stop pawl lever 31 is engaged with the step 30a3 of the lens control cam 30 if the counter 125 has counted 5. When the zone is the F, the AF magnet 34 is turned off and the pawl 31b of the stop pawl lever 31 is engaged with the lens control cam 30a4 if the counter 125 has counted 7.

In the operation of the normal condition as described hereinabove, the "H" signal (memory clock signal) is outputted from the gate 31 at the timing when the distance measuring completion signal from the timer circuit 114 has become "H" as shown in FIG. 17 and the signal is reversed by the inverter G32. Thus, as the gate G33 is closed and the lens error operation latch circuit 160 is inhibited from receiving any signal, the "L" signal closing the gate G31 is not outputted even if the lens position signal is subsequently inputted to the gate G33.

However, in the abnormal condition, when the lens position signal is fed to the gate G33 while the distance measuring completion signal is produced after the lens position input prohibition through a signal from the terminal a of the timer circuit 14, as shown in FIG. 17, has been released, the "H" signal of the lens position signal is inputted to the lens error operation latch circuit 160 through the gate G33, and the "L" signal is outputted to the gate G31 from the circuit 160. Accordingly, the gate is closed to prohibit the distance measuring completion signal from being inputted as a memory clock signal to the zone memory circuit 152. Thus, as the memory clock is not inputted if the light pulse is produced to measure the distance, the zone memory is not performed to neglect the result of the distance measurement. As a result, the output of the decoder 153 is reset, and the lens position counter is counting the position of the lens and remains initial, the zone M is shown. The lens stop is controlled to an intermediate position, i.e., the zone M as in a signal produced by the decoder 153. As the zone M is located in a fifth position of the lens position signals, the AF magnet 34 is turned off in a position where the lens position counter 125 has counted 5, and the focusing lens is stopped in a position where the focus coincides with the intermediate distance position B.

Figure 19:
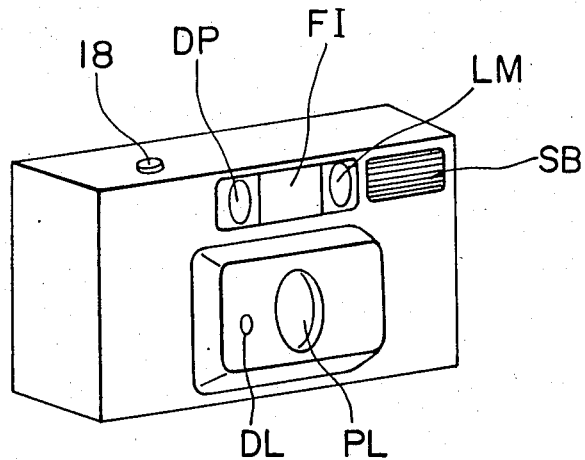
FIG. 19 is a perspective view showing one example of a camera to which one embodiment of the present invention is applied.

FIG. 19 shows a schematic diagram of this camera. This camera is provided on its top face with a shutter release button 18 and on its front face with a photo-taking lens PL, a light emitting portion DL for the distance measuring device including a light emitting elements LED, a light receiving portion DP for the distance measuring device, a finder F1, a light measuring portion LM for measuring the brightness of an object, and a strobo device SB.

Figure 20:
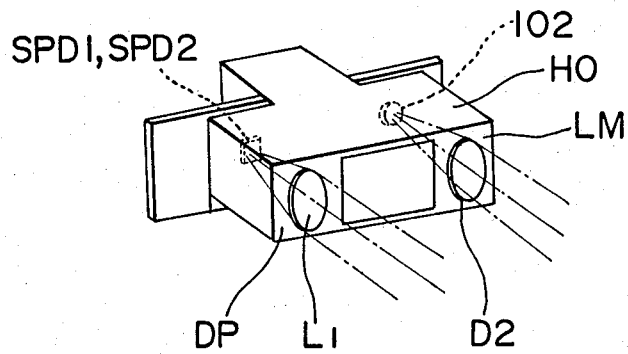
FIG. 20 is a perspective view of one example of a frame unit of a finder to be used in the camera of FIG. 19.

The light receiving portion DP for the distance measuring device, the finder F1 and the light measuring portion LM are integrally supported by a frame unit HO as shown in FIG. 20. In the light receiving portion DP, a focusing lens positioned before the light receiving elements SPD1 and SPD2. In the light measuring portion LM, the focusing lens L2 is positioned before the light receiving element 102.

Figure 21:
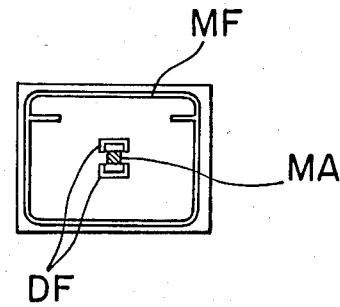
FIG. 21 is a front elevational view showing one example of the finder.

FIG. 21 shows the relationship between the field of view in the finder FI, the light receiving range (distance measuring range) of the light receiving portion DP and the light receiving range (light measuring range) of the light measuring portion LM.

The distance measuring range almost conforms to a region surrounded by the approximate central distance measuring-range indicating frame DF located within the field frame MF. The light measuring range overlaps the distance measuring range as shown by the hatched area and is set in a region MA smaller than the distance measuring range. If the distance measuring range and the light measuring range are set in the partial region of the photograph range, and are constructed to be almost overlapped with each other as described hereinabove, it is optimum for them to conform to each other although some difference in size between them is allowed.

In the concrete construction for causing the distance measuring range to substantially match with the light measuring range, the focus distance of the lenses L1 and L2 and the light receiving faces of the light receiving elements SPD1, SPD2, 102 are properly set in size so that the light receiving portion DP and the light receiving portion LM may have substantially the same at the light receiving angle, and the optical axis of the lenses L1 and L2 of the light measuring portion, the light receiving portion may be made substantially parallel to each other.

In the above-described construction, when the shutter release button is half depressed in the camera, the power supply switch SW1 is closed and the engagement of the control engagement lever 22 is not released by an auxiliary release plate 19. In this condition, the object brightness information is stored in the brightness decision circuit 115 and the AD conversion circuit 116 in accordance with the incident light to the light measuring portion LM, corresponding to the closing of the power supply switch SW1 as described hereinabove, and the object distance information is stored in the zone memory 152 in accordance with the incident light to the light receiving portion DP. As the brightness and distance information stored in this manner relates to approximately common object located within almost overlapped light measuring and distance measuring range as shown in FIG. 21, the information necessary for the photo-taking with the proper exposure can be stored, in a focusing condition with respect to an object to be photographed, by one operation. And the photo-taking operation can be performed which is focusing to the object and is proper in exposure even if the object is located outside the frame of the light measuring and the distance measuring range through change in the photo-taking operation. In particular, as the camera according for this embodiment of the present invention has the strobo capable of automatically being fired when the object brightness is low, the photo-taking operation under flash photography can be automatically effected when the object is dark even if an object to be photographed is located outside the light measuring and distance measuring range. Accordingly, the photo-taking operation which is focusing with respect to the object and is proper in exposure can be effected in free composition without any operation of a strobo radiation setting switch, a daytime synchro setting switch or the like.

In the embodiment, the distance information and the brightness information are stored by the closure of the power supply switch SW1 and thereafter this information is removed by the opening of the power supply switch SW1. When the power supply switch SW1 is closed again, the zone memory 152, the brightness decision circuit 115 and the AD conversion circuit 116 are respectively reset and, thereafter, the distance information and the brightness information are newly stored. Thus, the distance information and the brightness information can be stored over again through the restoration of the shutter release button once half-depressed into the initial position.

It is to be noted that the distance memory means and the brightness memory means may be performed by the mechanical memory mechanism. Namely, the stop mechanism for stopping the control plate 21 immediately before the engaged portion 21b is engaged with the shutter plate engagement lever 3 after the running operation in FIG. 2 is provided. When the control plate 21 has reached this position, the stop pawl lever 14 is engaged with the stop cam 11 to determine the exposure and the stop pawl lever 31 in FIG. 4 is engaged with the lens control cam 30 to complete the focusing. Accordingly, the distance information and the brightness information are mechanically stored by the stopping of the control plate 21 in this position to provide a freezed automatic exposure locking condition where the shutter reopening operation is not effected. The stop mechanism is adapted to release the control plate 21 through further depression of the shutter release button.

As described in detail in the embodiment, a safety device in the exposure control device of the camera in accordance with the present invention is provided with a first retaining means for maintaining the stop means inoperative till the A/D conversion of the conversion means is completed, a second retaining means for maintaining the stop means inoperative till the brightness signal is outputted from the conversion means, and a third retaining means for maintaining the stop means inoperative till the position signal is outputted. When the brightness signal and the position signal are not produced in given relation for regularly operating the stop means, the stop means is maintained inoperative to prevent the error operation. Thus, the given object can be achieved by the simple construction.

Although the present invention has been fully described with reference to the embodiments, many modifications and variations thereof will now be apparent to those skilled in the art, and the scope of the present invention is therefore to be limited not only by the details of the preferred embodiments described above, but only by the terms of the appended claims.

What is claimed is:

1. A camera capable of performing automatic focus adjustment and automatic exposure control, which comprises:

focusing means for effecting a focus adjustment of a photo-taking lens, said focusing means having a focusing member movable for the focus adjustment of the photo-taking lens;

means for controlling the exposure amount, said controlling means having an exposure control member movable for varying the exposure amount;

position detecting means for detecting the respective positions of the focusing member and the exposure control member and for generating a position signal indicative of the position of the focusing member and that of the exposure control member;

distance measuring means capable of performing a distance detecting operation to detect the distance to an object to be photographed an generating a first distance measurement signal indicative thereof;

signal producing means for generating a second distance measurement signal indicative of a predetermined intermediate distance;

output selecting means for outputting the second distance measurement signal as a distance signal before the completion of the distance detecting operation of the distance measuring means, but outputting the first distance measurement signal as the distance signal after the completion of said distance detecting operation;

brightness detecting means for detecting the brightness of the object and for generating a brightness signal indicative of said brightness;

first means for stopping the focusing member in accordance with said position signal and said distance signal; and second means for stopping the exposure control member in accordance with said position signal and said brightness signal.

2. A camera as claimed in claim 1, wherein said distance detecting means also includes means for generating a distance measurement completion signal in response to the detection of the completion of the distance detecting operation of the distance measuring means, and wherein said output selecting means includes means for outputting the second distance measurement signal as the distance signal in the event that the position signals are inputed preparatory to the distance measurement completion signal.

3. A camera as claimed in claim 2, wherein said means for outputting the second distance measurement signal as the distance signal in the event that the position signals are inputed preparatory to the distance measurement completion signal includes a memory means for storing the first distance measurement signal when the distance measurement completion signal is inputed, and an inhibiting means for inhibiting the distance measurement completion signal to said memory means when the position signals are inputed.

4. A camera capable of performing automatic focus adjustment and automatic exposure control, which comprises:

focusing means for effecting a focus adjustment of a photo-taking lens, said focusing means having a focusing member movable for the focus adjustment of the photo-taking lens;

means for controlling the exposure amount, said controlling means having an exposure control member movable for varying the exposure amount;

position detecting means for detecting the respective positions of the focusing member and the exposure control member and for generating a digital position signal indicative of the position of the focusing member and that of the exposure control member;

distance detecting means for detecting the distance to an object to be photographed and for generating a distance signal indicative of said distance;

means for measuring the brightness of the object and for generating an analog signal indicative of the brightness;

means for converting said analog signal into a digital signal;

means for outputting the digital brightness signal in accordance with the digital signal from the converting means;

first means for stopping the focusing member in accordance with said position signal and said distance signal;

second means for stopping the exposure control member in accordance with said position signal and said digital brightness signal; and means for disabling the second means before the completion of the conversion performed by the converting means, before the digital brightness signal is output from said means for outputting the digital brightness signal in accordance with the digital signal from the converting means, and before the digital position signal is output from the position detecting means.

5. A camera capable of performing automatic focus adjustment and automatic exposure control, which comprises:

focusing means for effecting a focus adjustment of a photo-taking lens, said focusing means having a focusing member movable for the focus adjustment of the photo-taking lens;

means for controlling the exposure amount, said controlling means having an exposure control member movable for varying the exposure amount, said exposure control member having a plurality of first engaged portions, arranged according to the exposure amount, and a second engaged portion provided on an extension thereof;

position detecting means for detecting the respective positions of the focusing member and the exposure control member and for generating a position signal indicative of the position of the focusing member and that of the exposure control member;

distance detecting means for detecting the distance to an object to be photographed and for generating a distance signal indicative of said distance;

brightness detecting means for detecting the brightness of the object and for generating a brightness signal indicative of said brightness;

first means for stopping the focusing member in accordance with said position signal and said distance signal; and second means for stopping the exposure control member in accordance with said position signal and said brightness signal, said second means including engaging means capable of engaging one of said first and second engaged portions of the exposure control member in dependence on the position signal; and comprising time controlling means for controlling the time during which a shutter is opened in accordance with the position at which the exposure control member is engaged by said engaging means, said time controlling means being operable to control, when one of the first engaged portions is engaged, the time during which the shutter is opened, in accordance with such engaged portions, but to maintain the shutter in opened position when the second engaged portion is engaged.

6. A camera as claimed in claim 5, wherein said time controlling means includes a shutter control member operable to close the shutter in dependence on the position at which one of the first engaged portions is engaged by said engaging means with an exposure control member movable in a predetermined direction for opening the shutter, said shutter control means being disengaged from the exposure control member when the second engaged portion is engaged.

7. A camera as claimed in claim 6, wherein said engaging means includes an engagement member movable between an engaged position at which it is engaged with any one of the first and second engaged portions, and a disengaged position at which it is disengaged from any one of the first and second engaged portions, a biasing means for urging said engagement member to the engaged position, and means including an electromagnet capable of being selectively energized and deenergized for controlling the position of the engagement member.

8. A camera as claimed in claim 7, wherein said second engaged portion is located on the position where it is engaged by the engaging portion prior to the first engaged portions when the exposure control member is moved from the initial position.

9. A camera as claimed in claim 8, wherein said electromagnet is operable to maintain the engagement member at the disengaged position against the biasing means when energized, said engagement member being moved to the engaged position by the biasing means when the electromagnet is not energized.

10. A camera capable of performing automatic focus adjustment, which comprises:

focusing means for effecting the focus adjustment of a photo-taking lens, said focusing means including a focusing member movable for the focus adjustment of the photo-taking lens;

position detecting means for detecting the position of the focusing member and for generating a position signal indicative of the position thereof;

distance detecting means for detecting the distance to an object to be photographed and for generating a distance measurement signal;

distance signal generating means for generating a distance signal indicative of a predetermined intermediate distance;

distance measurement completion signal generating means for detecting the completion of the distance detecting operation and for generating a distance measurement completion signal;

selector means for generating the distance signal as an output signal before the completion of a distance detecting operation, but generating the distance measurement signal as an output signal after the completion thereof;

said selector means including means operable to generate the distance signal as an output signal when the position signal is input prior to the input of the distance measurement completion signal; and stop means for stopping the focusing member according to the position signal and the output signal.

11. A camera as claimed in claim 10, wherein said means operable to generate the distance signal includes a memory means for storing the distance measurement signal when the distance measurement completion signal is inputed, and an inhibiting means for inhibiting the inputing of the distance measurement completion signal when the position signal is inputed.

12. A camera capable of performing an automatic exposure control, which comprises:

a control means for controlling the exposure amount, said control means including an exposure control member movable for changing the exposure amount;

a position detecting means for detecting the position of the exposure control member and for generating a digital position signal indicative of the position of the exposure control member;

a brightness detecting means for detecting the brightness of an object to be photographed and for generating an analog signal indicative of the brightness of the object;

an A/D conversion means for converting the analog signal into a digital signal;

a brightness signal output means for generating a digital brightness signal according to the digital signal;

a stop means for stopping the exposure control member according to the digital position signal and the digital brightness signal; and a disabling means for disabling said stop means until the following three conditions are accomplished: the completion of the A/D conversion performed by the conversion means; the generation of the brightness signal from the brightness output means; and the generation of the position signal from the position detecting means.

13. A camera as claimed in claim 12, wherein said disabling means includes a first means for disabling the stop means before the completion of the A/D conversion, a second means for disabling the stop means before the outputing of the brightness signal, and a third means for disabling the stop means before the outputing of the position, signal.

14. A camera having an exposure control device, which comprises:

an exposure control member adapted to be moved from a predetermined initial position for the exposure control, said exposure control member having a plurality of first engaged portions, arranged in correspondence with an exposure amount, and a second engaged portion provided on an extension thereof;

a stop means for engaging any one of said engaged portions according to a desired exposure amount to stop the exposure control member; and a time control means for controlling, according to the position at which the exposure control member is stopped, the time during which a shutter is opened, said time control means being, when any one of said first engaged portions is engaged, operable to control the shutter opening time according thereto, but when the second engaged portion is, engaged, operable to keep the shutter in, opened position.

15. A camera as claimed in claim 14, further comprising a reset means for resettihg the shutter from an opened position to a closed position in response to a winding operation.

16. A camera as claimed in claim 14, wherein said time control means includes a shutter control member movable in a predetermined direction for opening the shutter, said shutter control member in the condition when one of the first engaged portions is engaged by the stop means, being engaged with the exposure control member to close the shutter according to the position at which they are engaged, but said shutter control member in the condition when the second engaged portion is engaged being disengaged from the exposure control member.

17. A camera as claimed in claim 16, wherein said shutter control member includes an engagement member movable between an engaged position at which it is engaged with any one of the first and second engaged portions, and a disengaged position at which it is disengaged from any one of the first and second engaged portions, a biasing means for urging said engagement member to the engaged position, and an electromagnet operable, when an electric power is supplied thereto, to maintain the engagement member at the disengaged position against the biasing means.

18. A camera as claimed in claim 17, wherein said second engaged portion is located on the position where it is engaged by the engagement member prior to the first engaged portions when the exposure control member is moved from the initial position.

* * * * *